US012212196B2

(12) United States Patent
Kim

(10) Patent No.: US 12,212,196 B2
(45) Date of Patent: Jan. 28, 2025

(54) REDUCTION RATE AND VOLTAGE MULTIPLE FOR PARALLEL CIRCUIT

(71) Applicant: CALEB INNOVATIONS INC., San Jose, CA (US)

(72) Inventor: Nam Ho Kim, Namyanggju-si (KR)

( * ) Notice: Subject to any disclaimer, the term of this patent is extended or adjusted under 35 U.S.C. 154(b) by 0 days.

(21) Appl. No.: 17/698,254

(22) Filed: Mar. 18, 2022

(65) Prior Publication Data

US 2022/0302805 A1    Sep. 22, 2022

Related U.S. Application Data

(60) Provisional application No. 63/162,807, filed on Mar. 18, 2021.

(51) Int. Cl.
*H02K 15/04*    (2006.01)
(52) U.S. Cl.
CPC ................ *H02K 15/0435* (2013.01)
(58) Field of Classification Search
CPC ................ H02K 15/0435; H02K 3/28
See application file for complete search history.

(56) References Cited

U.S. PATENT DOCUMENTS

| | | | |
|---|---|---|---|
| 3,324,371 | A | 6/1967 | Stauffer |
| 3,774,062 | A | 11/1973 | Johnson |
| 4,880,391 | A | 11/1989 | Hurtgen |
| 7,489,055 | B2 | 2/2009 | Jeong et al. |
| 7,772,737 | B1 | 8/2010 | Fakonas |
| 2005/0073207 | A1 | 4/2005 | Goche |

(Continued)

FOREIGN PATENT DOCUMENTS

| | | |
|---|---|---|
| CA | 960277 | 12/1974 |
| CN | 201303262 Y | 9/2009 |

(Continued)

OTHER PUBLICATIONS

Anthony Z. et al.: Windings Design for Single-phase Induction Motors Base on 4-phase Induction Motor (Case study: identical windings design). MATEC Web Conf., 215 (2018) 01023 DOI: https://doi.org/10.1051/matecconf/201821501023.

(Continued)

*Primary Examiner* — Aneeta Yodichkas
*Assistant Examiner* — Jose K Abraham
(74) *Attorney, Agent, or Firm* — Norton Rose Fulbright US LLP

(57) ABSTRACT

This disclosure provides systems, methods, and apparatuses, for producing an electrical apparatus. In one aspect of the disclosure, a method includes identifying a first electrical apparatus including a first winding configured to receive a first voltage, the first winding including a first electrical coil and a second coil coupled in series. The method also includes determining, based on a reduction rate, one or more characteristics of a second electrical apparatus including a second winding configured to receive the first voltage, the second winding including a third electrical coil and a fourth coil coupled in parallel. Each of the first coil and the second coil including a first number of turns and each of the third coil and the fourth coil including a second number of turns. The reduction rate is associated with a ratio based on a reducing number of turns and the first number of turns.

15 Claims, 11 Drawing Sheets

(56) References Cited

U.S. PATENT DOCUMENTS

| | | | | |
|---|---|---|---|---|
| 2006/0273766 A1* | 12/2006 | Kawamura | ............ | H02K 19/36 |
| | | | | 322/46 |
| 2010/0181860 A1* | 7/2010 | Pulnikov | ................ | H02K 3/493 |
| | | | | 310/195 |
| 2010/0295519 A1* | 11/2010 | Tunzini | ................... | H02P 25/22 |
| | | | | 322/90 |
| 2011/0127875 A1* | 6/2011 | Pulnikov | ................ | H02K 15/12 |
| | | | | 310/195 |
| 2011/0273168 A1 | 11/2011 | Strothmann | | |
| 2016/0204728 A1* | 7/2016 | Notohara | ................. | B60L 7/14 |
| | | | | 310/198 |
| 2018/0013329 A1 | 1/2018 | Aoyama | | |
| 2020/0212746 A1 | 7/2020 | Liu | | |

FOREIGN PATENT DOCUMENTS

| | | | | | | |
|---|---|---|---|---|---|---|
| EP | 2401803 | B1 | | 2/2010 | | |
| JP | 2020174513 | A | * | 10/2020 | .............. | H02K 1/16 |
| KR | 101525399 | B1 | * | 3/2014 | | |
| WO | WO-2021010404 | A1 | * | 1/2021 | ............. | H02K 17/12 |

OTHER PUBLICATIONS

International Search Report and Written Opinion issued in corresponding International application PCT/IB 22/52492 mailed Jul. 7, 2022.

* cited by examiner

REDUCTION RATE AND VOLTAGE MULTIPLE FOR PARALLEL CIRCUIT

CROSS-REFERENCE TO RELATED APPLICATIONS

This application claims the benefit of U.S. Provisional Patent Application No. 63/162,807, filed on Mar. 18, 2021, the content of which is expressly incorporated by reference herein in its entirety.

TECHNICAL FIELD

Aspects of the present disclosure relate generally to an electrical apparatus and more particularly, but not by way of limitation, to design of an electrical apparatus including a winding including multiple coils.

DESCRIPTION OF THE RELATED TECHNOLOGY

Electrical devices, such as a single phase induction motor, including an inductor are widely used. As an example, the single phase induction motor is an AC motor in which electrical energy is converted to mechanical energy to perform a task or function. Induction motors are commonly used, such as in low power applications. Additionally, induction motors are relatively inexpensive, reliable, have a simple construction, and are easy to repair. However, as cost of raw materials and energy increases, a cost of producing electrical devices, such as induction motors, also increases.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for producing an electrical apparatus. The method includes identifying a first electrical apparatus including a first winding configured to receive a first voltage. The first winding includes a first electrical coil and a second coil coupled in series. Each of the first coil and the second coil including a first number of turns, a first inductance based on the first voltage applied to the first winding, a first diameter of a first electrical conductor of the coil, a first length, and a first material. The method further includes determining, based on a reduction rate, one or more characteristics of a second electrical apparatus including a second winding configured to receive the first voltage. The second winding includes a third electrical coil and a fourth coil coupled in parallel. Each of the third coil and the fourth coil including a second number of turns, a second inductance based on the first voltage applied to the second winding, a second diameter of a second electrical conductor of the coil, a second length, and the first material. The reduction rate is associated with a ratio based on a reducing number of turns and the first number of turns.

Some configurations of the method of the present disclosure can include selecting the reduction rate, determining the second number of turns. Determining the second number of turns may include multiplying the reduction rate by two times the first number of turns (or by substantially or about two times the first number of turns) to determine a reducing number of turns; and subtracting the reducing number of turns from two times the first number of turns to generate the second number of turns. In some implementations, the first electrical apparatus and the second electrical apparatus are the same device type, the first electrical coil and the second electrical coil have the same resistivity, and the third electrical coil and the fourth electrical coil have the same resistivity. Additionally, the same device type may be a single phase motor, a three phase motor, or an energy storage system.

In some configurations of the method, the first electrical apparatus includes a first amount of iron, the second electrical apparatus includes a second amount of iron, and the second amount of iron is less than the first amount of iron. Additionally, or alternatively, the second number of turns is less than the first number of turns of the first electrical coil, the second inductance is greater than the first inductance, the second diameter is a smaller than the first diameter, the second length of is greater than the first length.

Some configurations of the method of the present disclosure can include manufacturing the second electrical apparatus based on the one or more characteristics. In some implementations, manufacturing the second electrical apparatus includes coupling the third coil and the fourth coil to a structure and coupling the third coil and the fourth coil in parallel to form the second winding configured to receive the first voltage. The method may also include providing the first voltage to the second winding.

In some configurations of the method, the second winding further includes a fifth electrical coil, and a sixth electrical coil. In some implementations, the third electrical coil and the fifth electrical coil are coupled in series and form a first set of coils, the fourth electrical coil and the sixth electrical coil are coupled in series and form a second set of coils, or a combination thereof. Additionally, the first set of coils and the second set of coils may be coupled in parallel and each configured to receive the first voltage.

In some configurations of the method, the second winding further includes a fifth electrical coil and a sixth electrical coil. In some implementations, each of the third, fourth, fifth, and sixth electrical coil coupled in parallel and configured to receive the first voltage.

Another innovative aspect of the subject matter described in this disclosure can be implemented in a method. The method includes coupling a first coil and a second coil to a structure. The method also includes coupling the first coil and the second coil in parallel to form a winding configured to receive a voltage. The first coil and the second coil may have the same number of turns, the same length, the same resistivity, or a combination thereof.

In some configurations of the method, the electrical apparatus includes a single phase motor, a three phase motor, or an energy storage system. Additionally, or alternatively, some configurations of the method of the present disclosure can include providing a voltage across the winding.

Another innovative aspect of the subject matter described in this disclosure can be implemented in an electrical apparatus. The electrical apparatus includes a stator defining a space and a rotor positioned within the space. The electrical apparatus further includes a winding coupled to the stator and configured to receive a first voltage. The winding includes a first coil associated with a first pole and a second coil associated with a second pole. The second coil is coupled to the first coil in parallel. The first coil and the second coil have the same number of turns, the same length, the same resistivity, or a combination thereof.

In some configurations of the electrical apparatus, the electrical apparatus includes a single phase induction motor. Additionally, or alternatively, the first coil, the second coil, or both include copper.

In some configurations of the electrical apparatus, the electrical apparatus includes a three phase motor. Additionally, or alternatively, the winding may associated with a first phase of the three phase motor.

In some configurations of the electrical apparatus, the winding includes a main winding. In some implementations, the first coil includes a first end and a second end, and the second coil includes a first end and a second end. In some implementations, the first coil includes a third pole and the second coil includes a fourth pole. Alternatively, the winding further includes a third coil associated with the third pole and a fourth coil associated with the fourth pole, such that the first, second, third, and fourth coils are coupled in parallel.

Some configurations of the electrical apparatus of the present disclosure can include an auxiliary winding coupled to the main winding. The winding may also include a third coil and a fourth coil coupled to the third coil in parallel.

In some configurations of the electrical apparatus, the first coil and the second coil include the same material, the same number of turns, the same resistivity, the same gauge size, the same electrical resistance, or a combination thereof. Additionally, or alternatively, the first end of the first coil and the first end of the second coil may be coupled together to form a first end of the winding, the second end of the first coil and the second end of the second coil may be coupled together to form a second end of the winding, and the first end of the winding and the second end of the winding may be configured to receive the voltage.

Some details associated with the implementations are described above, and others are described below. Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

A further understanding of the nature and advantages of the present disclosure may be realized by reference to the following drawings. The following drawings illustrate by way of example and not limitation. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION OF THE INVENTION

Figure 1:
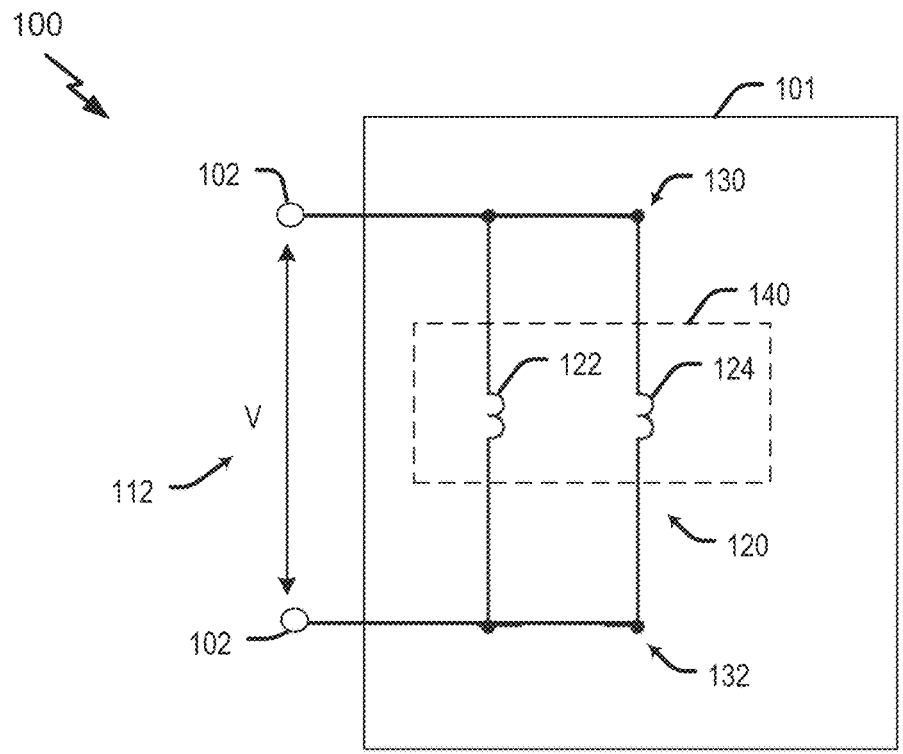
FIG. 1 is a block diagram of an example of an electronic device according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for an electrical apparatus. For example, the systems, apparatus, methods, and computer-readable media enable design of an electrical apparatus including a winding including multiple coils. To illustrate, a reducible parallel conversion (RPC) process may be to a first electrical device, such as a conventional electrical device, do design a second electrical device. As compared to the first electrical device, the second electrical device may include an smaller amount of a conductive material (e.g., copper), a smaller amount of iron (e.g., of a stator or toroid), may have greater energy efficiency, or a combination thereof. In some implementations, the first electrical device and the second (e.g., a split-phase induction motor, a capacitor-start motor, a two-value capacitor motor, a permanent-split capacitor motor, or a shaded pole motor) electrical device may be the same type of device, such as a single phase induction motor, a three phase induction motor, or an energy storage system. The first electrical device may include a winding including multiple coils configured in series, and the second electrical device may include multiple coils that are coupled in parallel.

Particular implementations of the subject matter described in this disclosure can be implemented to realize one or more of the following potential advantages. In some aspects, the present disclosure enables and provides the coils of the second electrical device, as compared to the coils of the first electrical device, as having a larger inductance, the same material, the same resistivity, a smaller diameter, a fewer number of turn, a smaller volume of conductive material, a small slot occupancy, or a combination thereof.

Referring to FIG. 1, FIG. 1 is a block diagram of an example of an electrical device 100 according to one or more aspects. The electrical device 100 may include or correspond to a single phase induction motor, a three phase induction motor, an energy storage system, or the like, as illustrative, non-limiting examples.

Electrical device 100 include a housing 101 and inputs 102 configured to receive a voltage V 112. Electrical device 100 also includes a winding 120. Winding 120 includes a first end 130 and a second end 131. In some implementations, winding 120 is configured to receive voltage 112.

Winding 120 includes a first coil 122 (e.g., a first pole) and a second coil 124 (e.g., a second pole). First coil 122 and second coil 124 are coupled in parallel. For example, first coil 122 and second coil 124 may be coupled in parallel between first end 130 and second end 132. When voltage V 112 is applied to inputs 102, each of first coil 122 and second coil 124 may be configured to have the same voltage potential established across the coil.

Although winding is shown has including two coils, in other implementations, winding may include more than two coils. For example, winding may include a third coil and a fourth coil. In some implementations, first coil 122, second coil 124, the third coil, and the fourth coil may each be coupled in parallel between first end 130 and second end 132. In some other implementations, winding may include multiple sets of coils that are in parallel, where each set of the multiple sets include two or more coils in series. For example, a first set may include first coil 122 in series with the third coil, and a second set may include second coil 124 in series with the fourth coil. The first set may be in parallel with the second set between first end 130 and second end 132. Although described as having 2 coils or 4 coils, these examples are not intended to be limiting and electrical device 100 may include 3 coils or more than 4 coils.

In some implementations, electrical device 100 may include a structure 140 (as indicated by a dashed box). For example, structure 140 may include a stator or a toroid. Winding 120 may be coupled to structure 140. To illustrate, first coil 122, second coil 124, or both may be coupled to structure 140.

In some implementations, first coil 122 and second coil 124 have the same turns, the same inductance (based on the voltage V 112 applied to winding 120), the same diameter of an electrical conductor of the coil, the same length, the same material, the same resistivity, or a combination thereof. Additionally, or alternatively, first coil 122 and second coil 124 have substantially the same turns, substantially the same inductance (based on the voltage V 112 applied to winding 120), substantially the same diameter of an electrical conductor of the coil, substantially the same length, substantially the same material, substantially the same resistivity, or a combination thereof.

Figure 2:
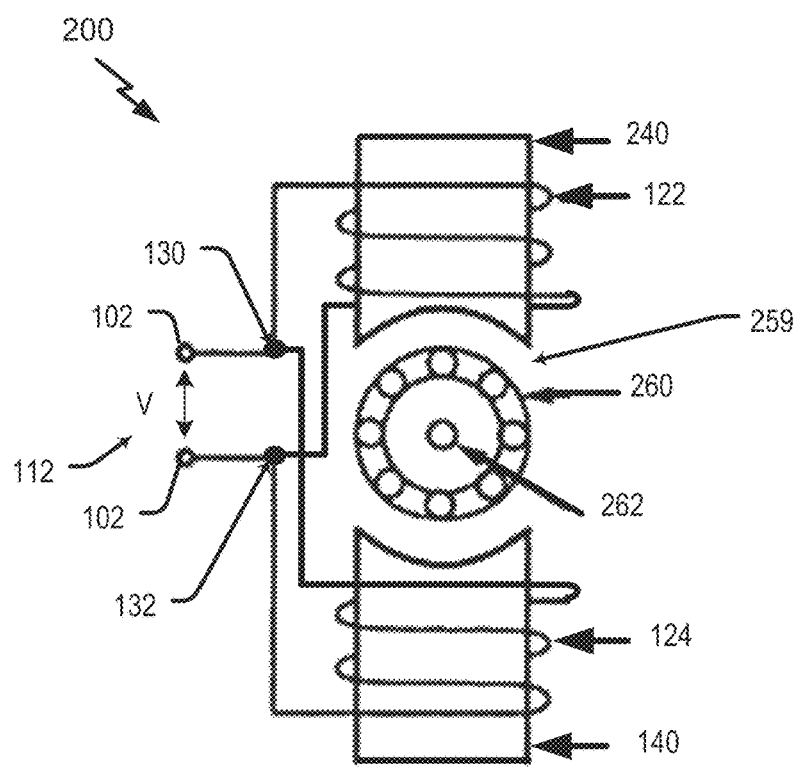
FIG. 2 is a diagram of an example of a single phase induction motor according to one or more aspects.

Referring to FIG. 2, FIG. 2 is a diagram of an example of a single phase induction motor (SPIM) 200 according to one or more aspects. SPIM 200 may include or correspond to electrical device 100. Although described as being a single phase induction motor, in other implementations, FIG. 2 may show a first phase of a three phase induction motor.

SPIM includes inputs 102, stator 240, rotor 260, and a winding (e.g., 120) including first coil 122 and second coil 124. Stator 240 may include or correspond to structure 140. Stator 240 may define a space 259 (e.g., a channel, a cavity, etc.) in which rotor 260 is positioned. Rotor 260 may include an output 262, such as a shaft. In some implementations, winding (e.g., 120) may be a main winding of SPIM 200 or, alternatively, an auxiliary winding of SPIM 200.

Winding (e.g., 120) is coupled to stator 240 and configured to receive voltage V 112. First coil 122 may be associated with a first pole, and second coil 124 may be associated with a second pole. Second coil 124 is coupled in parallel with first coil 122 between first end 130 and second end 132. First coil 122 and second coil 124 have the same number of turns, the same length, the same resistivity, or a combination thereof. Additionally, or alternatively, first coil 122 and second coil 124 include, substantially or exactly, the same material, the same number of turns, the same resistivity, the same gauge size or diameter electrical conductor, the same electrical resistance, and combination thereof. In some implementations, first coil 122, Second coil 124, or both may include copper.

In some implementations, first coil 122 includes a first end and a second end. Additionally, second coil 124 includes a first end and a second end. The first end of first coil 122 may be coupled to the first end of second coil 124, the second end of first coil 122 may be coupled to the second end of second coil 124, or a combination thereof. In some implementations, the first end of the first coil 122 is coupled to first end 130, the first end of second coil 124 is coupled to first end 130, the second end of first coil 122 is coupled to second end 132, the second end of second coil 124 is coupled to second end 132, or a combination thereof. In some implementations, the first end of first coil 122 and the first end of second coil 124 are coupled together to form first end 130 of the winding, the second end of first coil 122 and the second end of second coil 124 are coupled together to form second end 132 of the winding, and first end 130 of the winding and second end 132 of the winding are configured to receive voltage V 112.

In some implementations, the winding (e.g., 120) includes a third pole and a fourth pole. For example, the winding (e.g., 120) may include a third coil associated with the third pole and a fourth coil associated with the fourth pole. In some implementations, the first, second, third, and fourth coils coupled in parallel. For example, each coil of, the first, second, third, and fourth coils may receive voltage V 112. In other implementations, first coil 122 may be in series with third coil to form a first set of coils, and second coil 124 may be coupled in series with fourth coil to form a second set of coils. The first set of coils and the second set of coils may be coupled in parallel.

Figure 3:
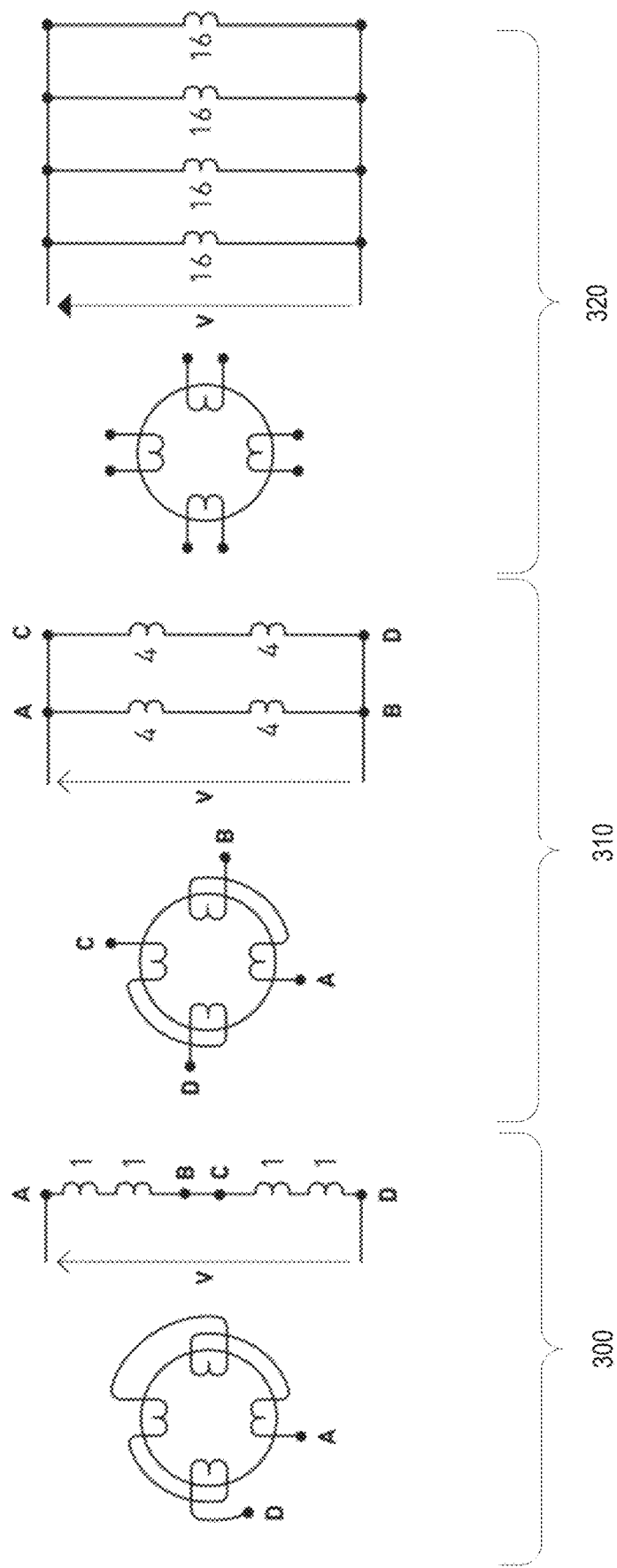
FIG. 3 is a diagram of examples of windings to demonstrate reducible parallel conversion techniques according to one or more aspects.

Referring to Figure, FIG. 3 is a diagram of examples of windings to demonstrate reducible parallel conversion techniques according to one or more aspects. For example, FIG. 3 shows schematic diagram and circuit for the main coil of 4-pole SPIM (Single Phase Induction Motor). To illustrate, FIG. 3 shows a first SPIM 300, a second SPIM 310, and a third SPIM 320.

Referring to first SPIM 300, a winding (e.g., the main coil) includes four coils electrically coupled in series between node A and node D. Each coil of the four coils may be associated with a different pole and may be coupled to a stator. As shown, a first and second coil are in series between node A and node B, and a third and fourth coil are in series between node C and node D. It is noted that node B and node C may be the same node. Node A and D are configured to receive a voltage V.

Referring to second SPIM 310, a winding (e.g., the main coil) includes four coils. Each coil of the four coils may be associated with a different pole and may be coupled to a stator. As shown, a first and second coil are in series between node A and node B, and a third and fourth coil are in series between node C and node D. The first and second coils may be in parallel with the third and fourth coils. It is noted that node A and node C may be the same node, and node B and node D may be the same node. Node A and node D (and node C and node D) are configured to receive a voltage V.

Referring to third SPIM 320, a winding (e.g., the main coil) includes four coils. Each coil of the four coils may be associated with a different pole and may be coupled to a stator. As shown, the four coils are coupled in parallel and are each configured to a voltage V.

Although SPIMs 300, 310, and 320 are described as having 4 poles or 4 coils, this is for purposed of providing an example and is not intended to be limiting. For example, SPIMs 300, 310, or 320 may include fewer or more than 4 poles or 4 coils.

Parallel Mode

It is noted that one thick coil can equal current flow with two thin coils. The thin coil ($G_2$ coil) should be half the cross section area and double the length to the thick original coil ($G_1$ coil). In some implementations, the winding of the first SPIM 300 may include the $G_1$ coil, the winding of the second SPIM 310 may include a first $G_2$ coil (having a first diameter/gauge), and the winding of the third SPIM 320 may include a second coil (having a second diameter/gauge). The first diameter/gauge may be the same as or different than the second diameter/gauge.

Referring to FIG. 3, an ohmic value '1' represents the resistance or the inductive reactance value per pole of first SPIM 300, an ohmic value '4' represents the resistance or inductive resistance value per pole of second SPIM 310, and an ohmic value '16; represents the resistance or inductive resistance value per pole of third SPIM 320. If two series poles AB and CD of first SPIM 300 are reconnected in parallel as shown in second SPIM 310, the voltages across AB and CD become to double voltage (DV) compared to first SPIM 300. Accordingly, second SPIM 310 shows a double voltage DV parallel mode (as compared to first SPIM 300), where the voltage is double voltage (DV).

The double voltage DV is responsible for the revival capability of inductance L. It may be more appropriate to use double flux (DΦ) instead of inductance L because the flux Φ is proportional to the number of turns. The ohmic value '4' shown in second SPIM 310 represents the resistance (R) or the inductive reactance (L) value per pole as expressed in Equations (1)-(2), where R or L associated with second SPIM 310 is indicated with primes.

$$R' = \frac{2l}{\left(\frac{1}{\sqrt{2}}\right)^2 S} = 4R \qquad \text{Equation (1)}$$

$$L' = \frac{N^2}{R_r} = 2^2 L = 4L \qquad \text{Equation (2)}$$

Referring to Equations (1), l is length of a coil per pole, and S is the cross-sectional area of a coil.

The impedance of each pole of second SPIM 310 is 4 times to that of first SPIM 300, and the equivalent impedances ($Z_{eq}$) of two circuits are the same as $Z_{eq}$=4+j4. A current through the winding of first SPIM 300 and second SPIM 310 is the same; however, the voltage through each coil (e.g., pole) of second SPIM 310 is twice as high as the voltage through each coil (e.g., pole) of first SPIM 300.

The impedance of each pole of third SPIM 320 is 16 times to that of first SPIM 300. The voltage through each coil (e.g., pole) of third SPIM 320 is four as high as the voltage through each coil (e.g., pole) of first SPIM 300. Accordingly, third SPIM 320 shows a quadruple voltage QV parallel mode (as compared to first SPIM 300), where the voltage is quadruple voltage (QV).

Reducible Parallel Conversion (RPC)

There has been always a conflict between using a thick coil to increase the current and increasing the number of turns to increase the inductance L. Inductance L is defined as flux linkage per unit current.

$$L = \frac{\lambda}{i} = \frac{N\Phi}{I} \qquad \text{Equation (3)}$$

Referring to Equations (1)-(2), L is inductance, λ is flux linkage, i is current, N is the number of turns, and Φ is flux.

The rated number of turns is to be taken at 1 per-unit (p.u.). Units provided below are per-unit (p.u.).

$$\Phi = Li \quad \text{Equation (4)}$$

In Equation (4), inductance L and current i are inversely proportional. The rated current i=1 p.u. is much lower than the capacity of maximum allowable current because of high impedance of coil, despite using a thicker coil as possible. The more turns, the smaller the current gets. In a conventional Capacitor Run SPIM (CR-SPIM), the main current of the CR-SPIM is only half the current capacity.

Figure 4:
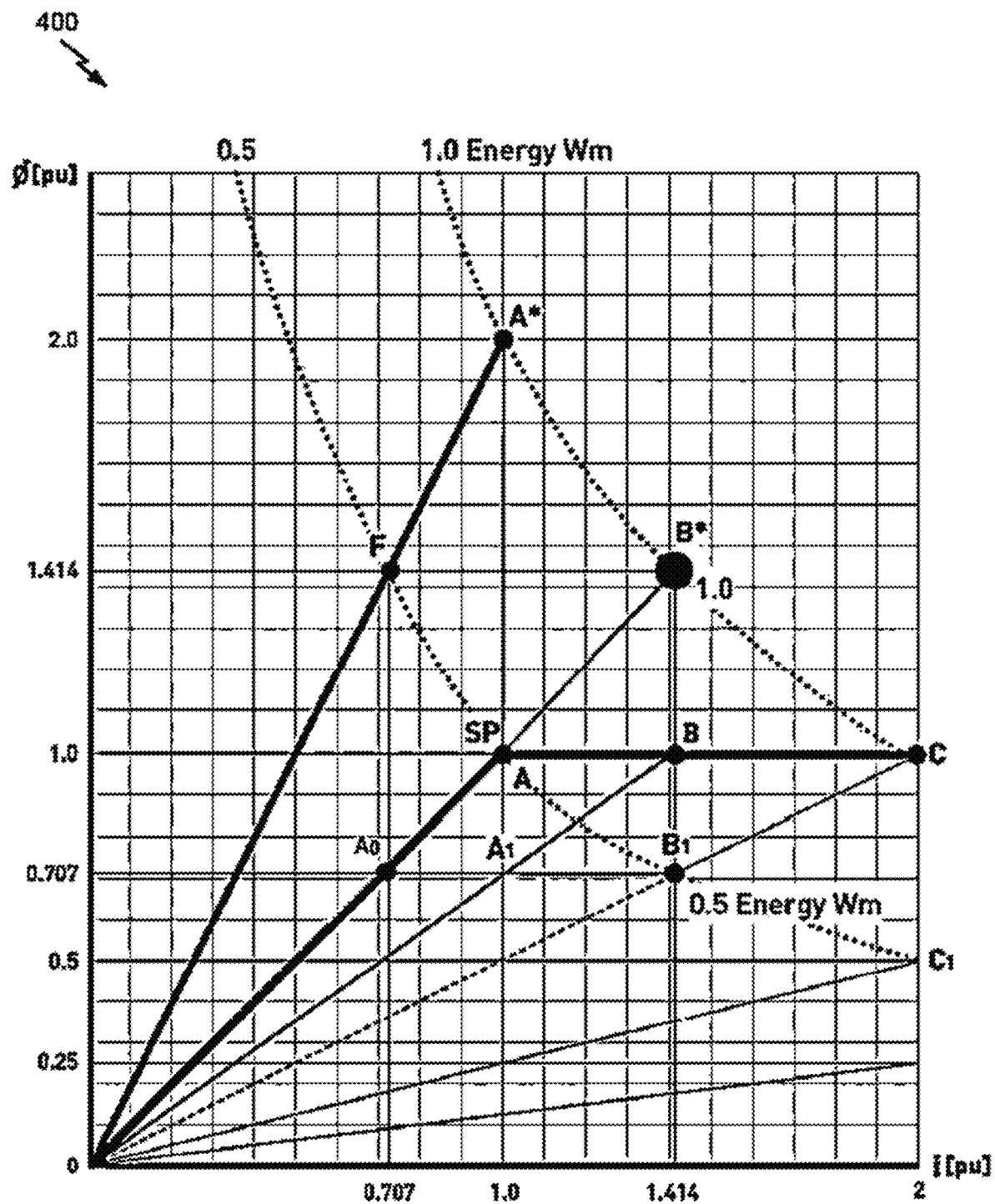
FIG. 4 is a graph to shows operating points of winding to demonstrate reducible parallel conversion techniques according to one or more aspects.

Referring to FIG. 4, FIG. 4 is a graph to shows operating points of winding to demonstrate reducible parallel conversion techniques according to one or more aspects. For example, FIG. 4 shows a $\Phi$=Li Characteristics for RPC. To illustrate, FIG. 4 is a graphical solution that shows, in the (i, $\Phi$) plane, how to reduce the number of coil and restore the inductance L simultaneously. Stated differently, the variation of flux according to the increase of current due to coil reduction.

Referring to FIG. 4, the point A is the normal operating point of a conventional commercial motor, where the slope 1 of the straight line passing through point A represents the value of inductance L. The conventional commercial motor is designed so that the operating point A is near the saturation point (SP) in most electric machines. The saturation curve can be piecewisely linearized as a bold line.

As the maximum flux $\Phi_m$ exceeds the saturation point, the iron loss increases significantly, it is necessary to bring the maximum flux value down far below the saturation point. Therefore, it is desirable to increase the current by reducing the number of turns while keeping L at a higher value through DV—which is referred to herein as Reducible Parallel Conversion (RPC). Accordingly, the current is controlled by adjusting the amount of coil reduction. Additionally, a winding may be configured (or re-configured) to a DV parallel configuration.

RPC Element Characteristics and Equivalent Circuits

The ratio of the reducing number of turns to the total number of turns is defined as the reduction rate (RR). To illustrate, when the number of turns of the first device is 800, the number of turns of the second device is 1600—e.g., the number of turns of the second device is double that of the first device or is substantially or about double that of the first device. When a reduction rate=30 is applied, a number of turns to be reduced is (number of turns of second device*RR)=1600*0.3=480 turns. The resulting number of turns of the second device is determined by applying the reduction rate of 30% is 1600−480=1120 turns.

As an illustrative example, a notation for RPC as used herein may take the form of 0.12$\Phi$[0.2929], where the diameter of a $G_2$ coil is 0.12 millimeters (mm) and RR is 0.2929, about 30%. It is noted that a dimeter of 0.12 mm of $G_2$ coil multiple by $\sqrt{2}$ equals a diameter of 0.17 of a $G_1$ coil. Additionally, referring to TABLE 1, examples of $G_2$ coils for use with a stator frame SPIM 8428 are presented.

TABLE 1

| Coil diameter (mm) | Current ampacity (mA) | Resistance/turn (Ω) | Number of turns |
|---|---|---|---|
| 0.085 | 48 | 0.4573 | 3200 |
| 0.10 | 66 | 0.33 | 2310 |
| 0.11 | 80 | 0.27270 | 1909 |
| 0.12 | 96 | 0.22914 | 1604 |
| 0.13 | 112 | 0.19526 | 1367 |
| 0.14 | 130 | 0.16836 | 1179 |
| 0.15 | 150 | 0.14666 | 1027 |
| 0.16 | 170 | 0.12890 | 903 |
| 0.17 | 193 | 0.11418 | 799 |
| 0.18 | 215 | 0.10184 | 713 |
| 0.19 | 240 | 0.09141 | 640 |
| 0.20 | 266 | 0.08249 | 578 |
| 0.21 | 293 | 0.07488 | 524 |
| 0.22 | 322 | 0.06818 | 477 |
| 0.23 | 352 | 0.06233 | 437 |
| 0.24 | 383 | 0.05728 | 401 |
| 0.25 | 416 | 0.05274 | 370 |
| 0.38 | 960 | 0.02288 | 160 |

With reference to TABLE 1, the following notation is defined:

$\phi$: coil diameter;

A: current;

R: resistance per turn; and

N: number of turns.

Additionally, it is noted that:

$\phi^2 \propto A$;

$\phi^2 R$=constant; and $\phi^2 N$=constant.

Starting with 0.17$\phi$, values of 0.12$\phi$ may be determined as:

−Current ampacity $0.17^2 : 193 = 0.12^2 : x, x = 96$

−Resistance/turn $\phi^2 R = 0.17^2 \times 0.11418 = 0.0033$, $$y = \frac{0.0033}{0.12^2} = 0.229$$

−Number of turns $\phi^2 N = 0.17^2 \times 800 = 23.12$, $$z = \frac{23.12}{0.12^2} = 1600$$

Figure 5:
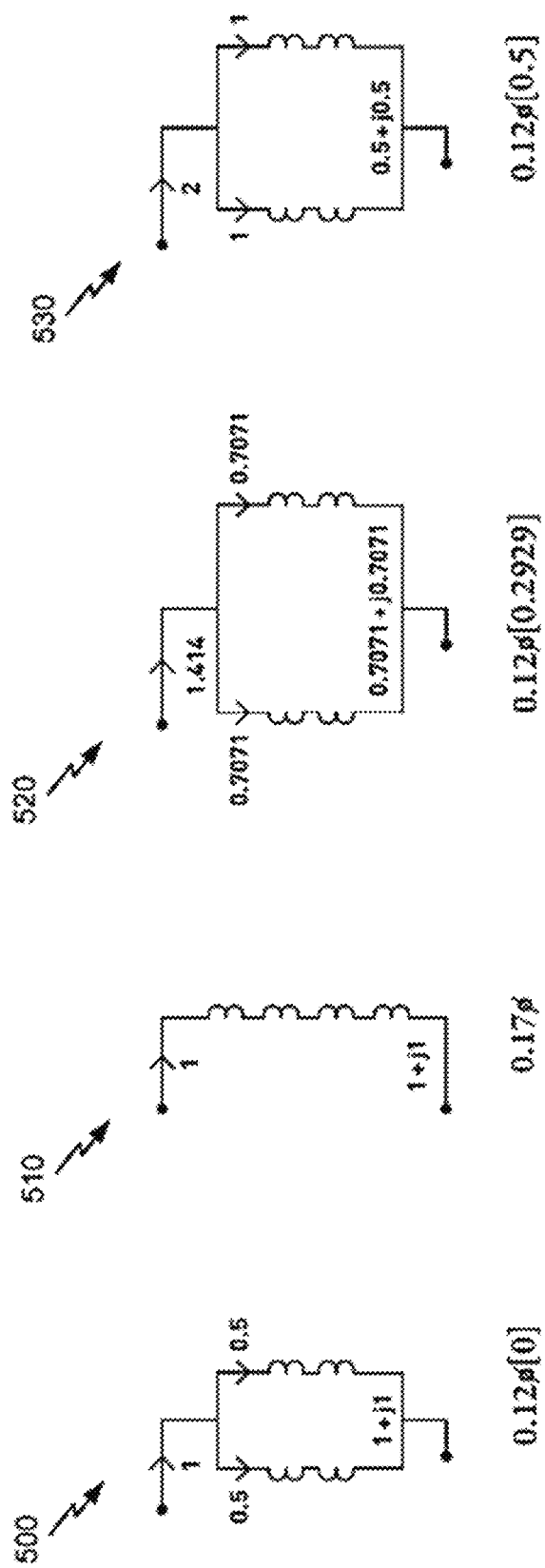
FIG. 5 is a diagram of other examples of windings to demonstrate reducible parallel conversion techniques according to one or more aspects.

Referring to FIG. 5, is a diagram of other examples of windings to demonstrate reducible parallel conversion techniques according to one or more aspects. For example, FIG. 5 shows equivalent circuits for different RR values. To illustrate, FIG. 5 shows a first circuit 500, a second circuit 510, a third circuit 520, and a fourth circuit 530. Second circuit 510 corresponds to a $G_1$ coil for a 4-pole SPIM with 0.17$\Phi$ (no RR). First circuit 500, third circuit 520, and fourth circuit 530 each have a RR with respect to second circuit 510. First circuit 500 corresponds to RPC 0.12$\Phi$ [0] with a $G_2$ coil with 100% turns (with reference to second circuit 510). Third circuit 520 corresponds to a $G_2$ coil for a 4-pole SPIM with 0.12$\Phi$[0.2929]. Fourth circuit 530 corresponds to a $G_2$ coil for a 4-pole SPIM with 0.12$\Phi$[0.5]. Additionally, referring to TABLE 2, the element characteristics and of the equivalent circuits of FIG. 5 are presented.

TABLE 2

| Type ↓ | RR | S | l | R | L | $Z_{eq}$ | I* | $I_{pu}$ | Equiv. Cir. | Note |
|---|---|---|---|---|---|---|---|---|---|---|
| 0.12Φ [0.0] | 0 | 1 | 1 | 1 | 1 | $\sqrt{2}$ | 0.7071 | 1 | 500 | RPC |
| 0.12Φ [0.2929] | 0.2929 | 1 | 0.7071 | 0.7071 | 0.7071 | 1 | 1 | 1.414 | 520 | RPC |
| 0.12Φ [0.5] | 0.5 | 1 | 0.5 | 0.5 | 0.5 | 0.7071 | 1.414 | 2 | 530 | RPC |
| 0.17Φ | — | 2 | 0.5 | 0.25 | 0.25** | $\sqrt{2}$ | 0.7071 | 1 | 510 | $G_1$ |

*I is the value obtained when the applied voltage is 1[p.u.].
**Since S and l have already been considered, it's obtained by $L = N^2$ In TABLE 2, parameters (e.g., values) are the normalized values. To illustrate, the parameters are normalized values based on those of 0.12Φ [0] coil as follows:
S; the cross-section area of coil;
l; the length of coil per pole;
R; the resistance per pole; and
L; the inductance per pole, where ω=1 and ω stands for the angular velocity expressed in units of [p.u.].

The inductance per pole is expressed using Equation (5) in a given magnetic material.

$$L = \frac{SN^2}{l} \quad \text{Equation (5)}$$

Since N is proportional to length l, therefore Equation 5 is the same as Equation (6).

$$L=1 \text{ (for S=1)} \quad \text{Equation (6)}$$

Additionally, according to the mmf equilibrium principle Ni=1, for example, i=$\sqrt{2}$ [p.u.] at N=0.7071 [p.u.]. It is noted that the larger the reduction rate RR, the greater the current becomes.

An analysis is provided below for each of first circuit 500, third circuit 520, and fourth circuit 530 with reference to a corresponding RR as compared to second circuit 510 in which a $G_1$ coil is composed of 4-pole series circuit with 0.17Φ.

Analysis of RPC 0.12Φ [0.0]

The $G_1$ coil is composed of 4-pole series circuit with 0.17Φ as shown in 510. The equivalent impedance of second circuit 510 (the $G_1$ coil composed of 4-pole series circuit with 0.17Φ) is identical to that of first circuit 500 with 0.12Φ[0], which does not have a reduction of turns as compared to first circuit 500. The current in first circuit 500 is equal to the current in second circuit 510. If the magnetic circuit is linear, the maximum flux $Φ_m$ of first circuit 500 is twice as high to that of second circuit 510. The value of inductance L is 2 for first circuit 500 and it is twice the value of point A (for second circuit 510) in FIG. 4. It is noted that there is saturation that occurs and point A* (for first circuit 500) will be moved (e.g., limited) to point A.

Analysis of RPC 0.12Φ [0.2929]

If the number of turns associated with second circuit 510 is reduced to 0.7071 as in third circuit 520, the current increases to 1.414 for third circuit 520. Assuming the magnetic circuit is linear, the flux jumps from $B_1$ (for second circuit 510) in FIG. 4 to B* (for third circuit 520). However, due to saturation, the flux stops at (e.g. is limited to) one and the inductance increases from 0.5 (for second circuit 510) to 0.7071 (for third circuit 520). Since the input current increases to 1.414, the output torque can be 141% to the maximum. With a 30% decrease in the amount of copper, the copper loss also decreases at the same rate for third circuit 520 as compared to second circuit 510.

Analysis of RPC 0.12Φ [0.5]

If the number of turns associated with second circuit 510 is reduced to 0.5 [p.u.] as in fourth circuit 530, the current increases to 2 [p.u.] for fourth circuit 530 and the flux Φ moves up to C point along the straight line Φ=0.5i. Referring to FIG. 4, FIG. 4 shows that the inductance increases from 0.25 (for second circuit 510) to 0.5 (for fourth circuit 530). Accordingly, a double current is achieved by reducing the number of turns in half and a double inductance is also achieved using a DV of a parallel mode. Additionally, magnetic energy doubles from point $C_1$ to point C, resistance and copper loss halved (as compared to second circuit 510).

Energy Stored in L

Referring to FIG. 4, through a point (i, Φ) of straight line magnetization characteristics =Li, there pass a hyperbola giving the value of the magnetic energy. The values of magnetic energy at all points on the same hyperbola, such as $B_1$ and $C_1$ are the same. The energy ($W_m$) stored may be expressed in an inductance L, carrying a current i, as $W_m = ½Li^2$. The energy levels at points A (see Equation (7)), B (see Equation (8)), and C (see Equation (9)) are as follows:

$$W_{m,A} = ½(1)1^2 = 0.5 \quad \text{Equation (7)}$$

$$W_{m,B} = ½(0.7071)1.414^2 = 0.7071 \quad \text{Equation (8)}$$

$$W_{m,C} = ½(0.5)2^2 = 1 \quad \text{Equation (9)}$$

The energy rates of the RPC operating points B and C to point A are 141% and 200%.

Copper and Iron Losses comparison

When RPC is applied, the amount of copper left behind (after reduction) is equal to after reduction) ⌈1−RR⌋, which means the amount of copper has been reduced by RR. A range of RR for DV may be as follows:

DV for 0.0<RR≤0.5   Equation (10)

Additionally, the iron loss is approximately proportional to the square of maximum flux $\Phi^2_m$ as the Steinmetz's experimental formula. The $\Phi_m$ is proportional to the induced emf E.

Figure 6:
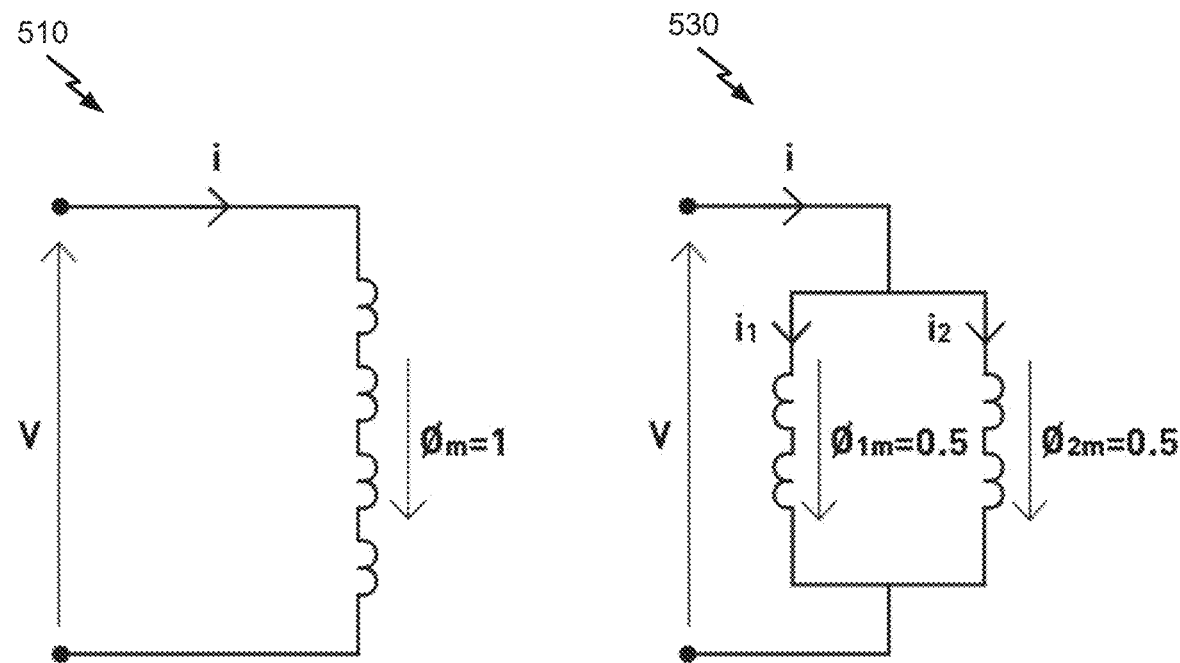
FIG. 6 is a diagram of other examples of windings to demonstrate reducible parallel conversion techniques according to one or more aspects.

Referring to FIG. 6, FIG. 6 is a diagram of other examples of windings to demonstrate reducible parallel conversion techniques according to one or more aspects. For example, FIG. 6 shows the flow diagram of flux corresponding to the equivalent circuits, i.e., second circuit 510 and fourth circuit 530, as described above. Where the maximum flux of the second circuit 510 (referred to as circuit "a") is set at 1, the maximum fluxes of fourth circuit 530 (referred to as circuit "b") are 0.5. The reduction of iron loss needs two paths for flux to flow. The iron loss for each operating point can be calculated as follows (wherein "a" corresponds to second circuit 510 and "b" corresponds to fourth circuit 530):

$$P_i(a)|_A = \Phi_m^2 = 1 \text{ [p.u.]} \tag{11}$$

$$P_i(b)|_C = \Sigma_{i=1}^2 \Phi_m^2 = 0.5^2 + 0.5^2 = 0.5 \text{ [p.u.]} \quad \text{Equation (12)}$$

It is noted that the iron loss for 0.12Φ [0.2929] (i.e., third circuit 520) is the same as that of 0.12Φ [0.5] (i.e., fourth circuit 530) due to the limitations of saturation characteristics. The copper loss and iron loss have almost the same trend. TABLE 3 shows the copper loss, iron loss and energy level according to RR. The copper losses and iron losses can be reduced considerably based on the same current criterion.

TABLE 3

| Type ↓ | Operating Point | RR (Rate of Reduction) | Copper Loss | Iron Loss | Energy Level | Note |
|---|---|---|---|---|---|---|
| 0.17 φ | A | 0 | 100 | 100 | 100 | Orignial |
| RPC 0.12 φ [0.2929] | B | 30 | 70 | 50 | 141 | DV |
| RPC 0.12 φ [0.5] | C | 50 | 50 | 50 | 200 | DV |

RPC Application Examples

CR-SPIM

Figure 7:
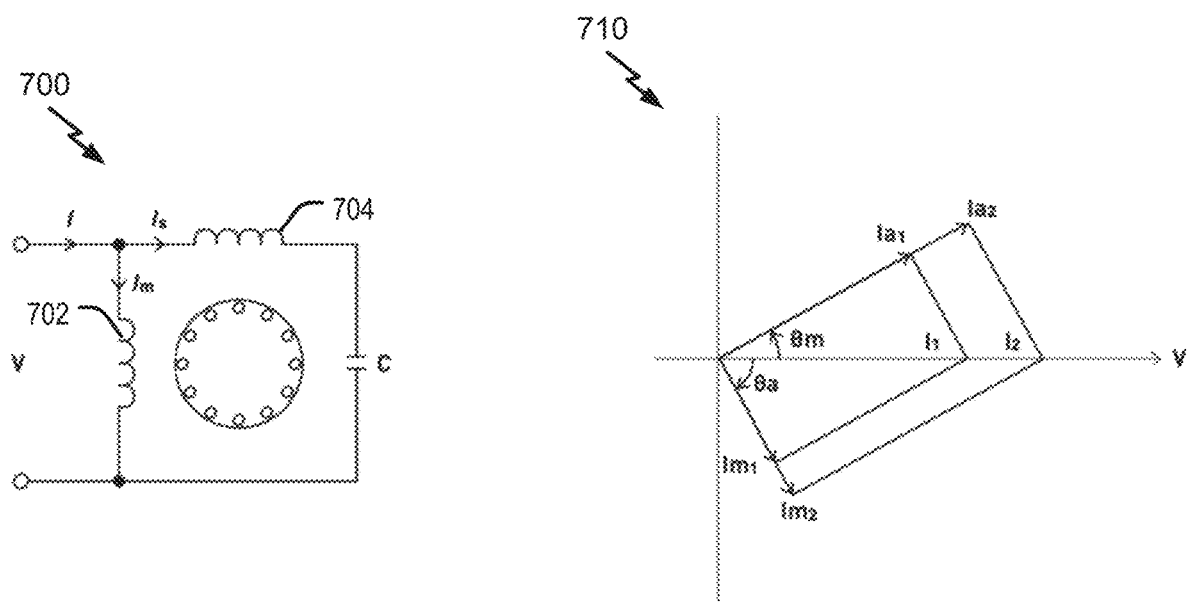
FIG. 7 is a diagram illustrating an example of a single phase induction motor according to one or more aspects.

Referring to FIG. 7, FIG. 7 is a diagram illustrating an example of a single phase induction motor according to one or more aspects. For example, FIG. 7 shows a schematic diagram of CR-SPIM 700 having 2 stator coils, a main coil 702 and an auxiliary coil 704, and a phase diagram 710.

Using RPC, it is possible to raise the input current by 41% at RR=30%. For example, if RPC is applied as described with reference to second SPIM 310 to the main coil and capacitor C is adjusted in order to achieve a good power factor, the results are as follows:

$$I_{m1}=1, I_{m2}=\sqrt{2}, I_{a1}=\sqrt{3}I_{m1}, I_{a2}=\sqrt{3}I_{m2} \quad \text{Equations (13)}$$

where subscripts 1 and 2 stand for before and after conversion as shown in phase diagram 710.

TABLE 4 shows the coil specifications for the original circuit and the RPC circuit (with reference also to TABLE 1) in which RR =30%.

TABLE 4

| | Main Coil | Aux. Coil |
|---|---|---|
| Original Circuit | 0.17 φ, 799 turns/pole (G₁ coil) | 0.17 φ, 799 turns/pole |
| RPC Circuit | 0.12 φ, 1134 turns/pole (G₂ coil) | 0.23 φ, 437 turns/pole |

The ratio of current product before and after conversion doubles at RR=30% as described here. If there is no intervention from any of the other factors, the starting torque is twice as much after RPC. When RR is 50%, the ratio of current product quadruples.
The ratio of current product $$|_{RR=30\%} = \frac{|I_{m2}||I_{a2}| \text{ after conversion}}{|I_{m1}||I_{a1}| \text{ before conversion}} = \frac{\sqrt{2}(\sqrt{2}\sqrt{3})}{1(\sqrt{3})} = 2 \quad \text{Equation (14)}$$

Although described with reference to a CR-SPIM, RPC may be applied to other types of inductions motors, such as other types of single phase motors or three phase motors. Single phase motors may include single phase induction motors, synchronous motors, and series motors. Three phase motors may include induction motors and synchronous motors. RPC may be applied AC motors, including brushless direct current (BLDC) motors (BLDC motors are classified as DC motors, but are synchronous motors).

Three Phase Induction Motors

Figure 8:
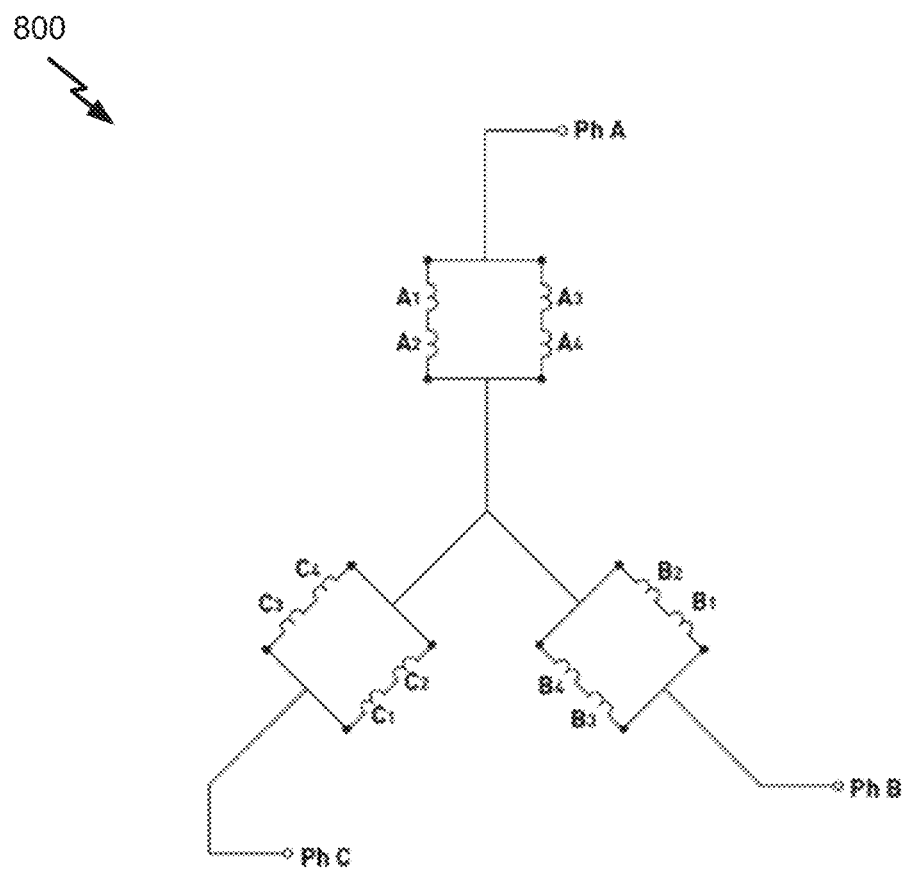
FIG. 8 is a diagram of an example of a three phase induction motor according to one or more aspects.
Figure 8:
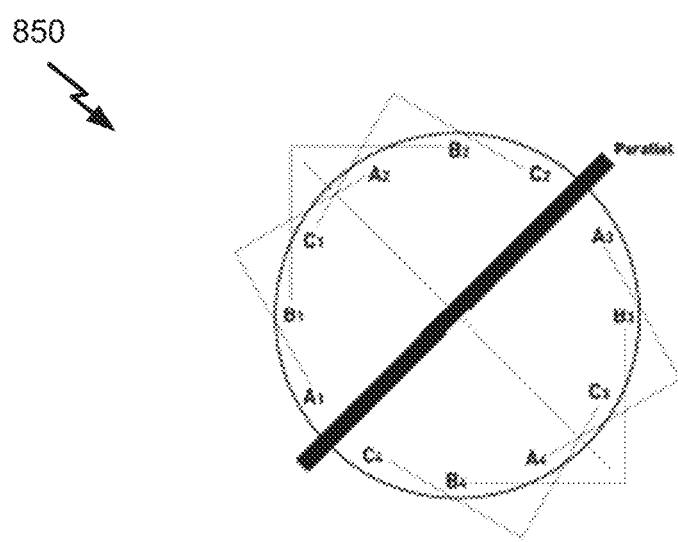

Referring to FIG. 8, FIG. 8 is a diagram of an example of a three phase induction motor according to one or more aspects. To illustrate, FIG. 8 shows a RPC circuit 800 of a 4-poles, 3-phase induction motor, and a 3-phase layout 850 of a stator for the RPC circuit 800.

As the mechanical degree $\theta_{md}$ is twice the electrical degree $\theta_{ed}$, overall coils for 3-phase, 4-pole of RPC circuit 800 are arranged as shown in 3-phase layout 850. As in a single phase induction motor described herein, the torque is going to be 141% at RR=30% for the RPC circuit 800.

It is noted that the stator windings of 3-phase synchronous motor is similar to those of a 3-phase induction motor. Accordingly, RPC may be applied a 3-phase synchronous motor, and may also be applied to the BLDC motor.

ESS (Energy Storage System)

Figure 9:
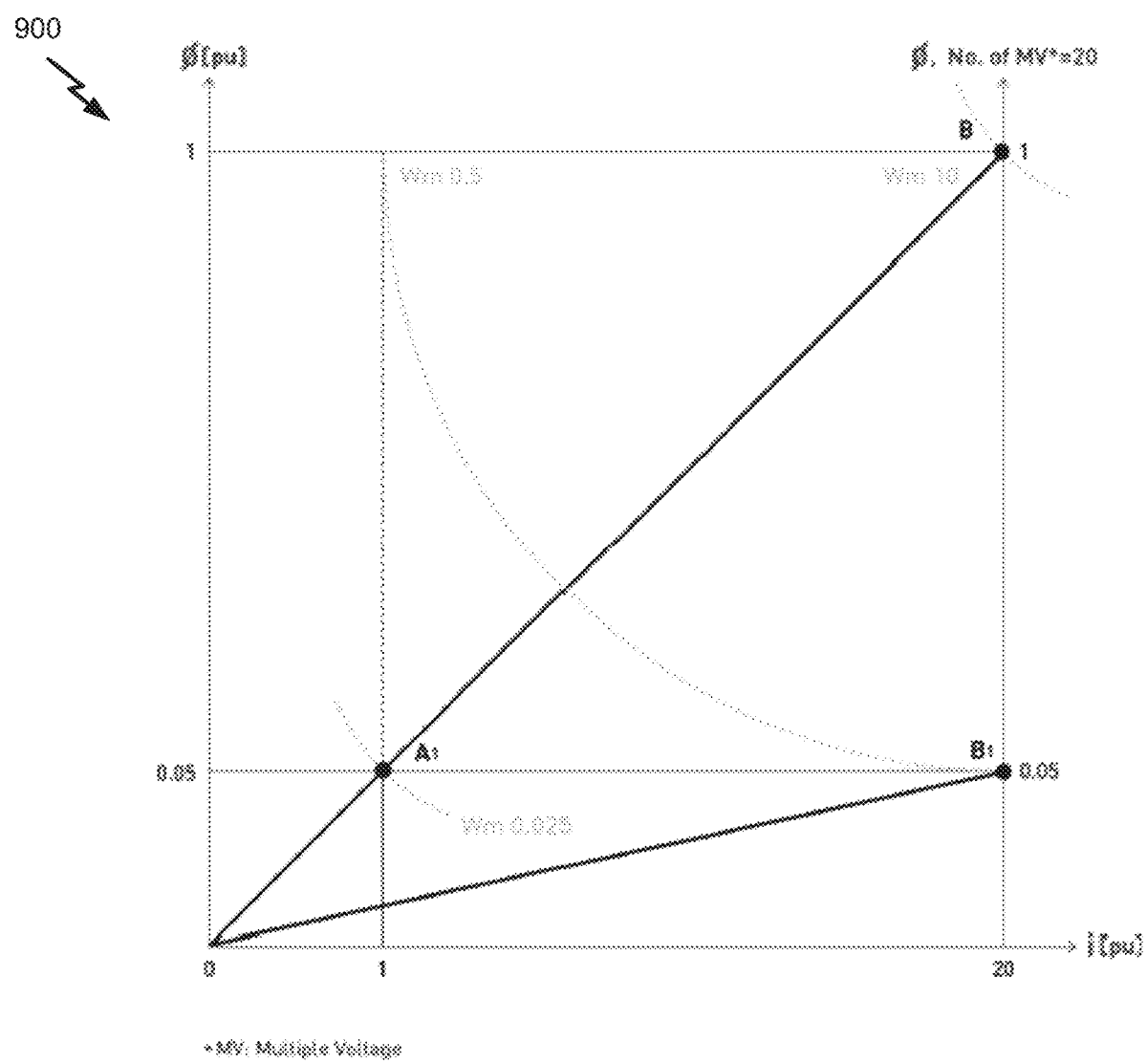
FIG. 9 is a graph of operation of an energy storage system according to one or more aspects.

Referring to FIG. 9, is a graph of operation of an energy storage system ESS according to one or more aspects. For example, FIG. 9 shows the graphical solution (e.g., graph 900) of an ESS with copper loss and iron loss of 5% each, which may be maximize the coil energy by increasing the inductance L and current i, simultaneously, while using a minimum amount of coil. Specifically, graph 900 shows Φ=Li Characteristics for an ESS with 20 parallel coils.

Referring to graph 900, graph 900 include the following points:

A₁—Operating point of one coil of 0.085Φ* at 1 [p.u.] current
B₁—Operating point of conventional, 20 series coil** of 0.38Φ at 20 [p.u.]
  Starting point of 20 parallel coil*** of 0.085Φ before MV conversion
B—Target point of 20 parallel coils of 0.085Φ after MV conversion The area from $B_1$ to B is the inductance extension through MV

* The current capacity of 0.085Φ coil is 0.05 times that of 0.38Φ coil (See TABLE 1).
** 20 series coil means a conventional coil with 20 coils connected in series.
*** 20 parallel coil means a development coil with 20 coils connected in parallel.

Figure 10:
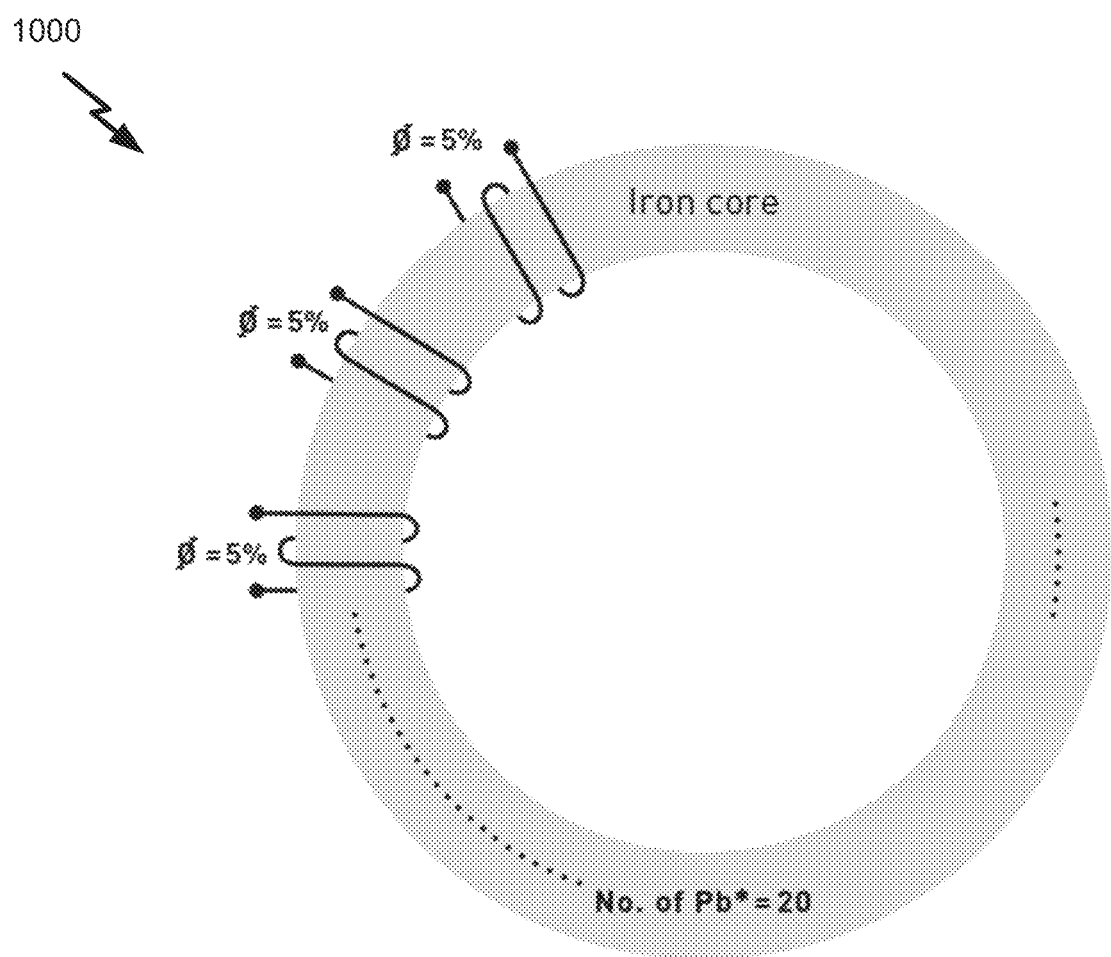
FIG. 10 is a diagram of a configuration of an energy storage system according to one or more aspects.

Referring to FIG. 10, FIG. 10 is a diagram of a configuration of an energy storage system ESS 1000 according to one or more aspects. For example, ESS 1000 of FIG. 10 includes an ESS toroid (e.g., a magnetic toroid) with 20 distinct, parallel coils. As shown, the ES toroid includes an iron core.

With reference to FIG. 9, ESS 1000 having 20 coils in parallel would produce a twentyfold current from point $A_1$ to $B_1$ and also twentyfold inductance from point $B_1$ to B. The inductances of point $B_1$ and B are 0.0025 and 0.05, respectively. The number of turns of each parallel coil is equal to the number of rated turns for the selected coil. The magnetic flux of point $B_1$ can reach Φ=1, at point B through 20 times the MV without further winding, where MV means that the voltage value of 20 coils in parallel (e.g., ESS 1000) is 20 times more than that of 20 coils in series without further winding.

$$MV(\text{multiple voltage}) = \frac{\text{Voltage of 20 coils in parallel}}{\text{Voltage of 20 coils in series}}$$

Through a point (i, Φ) of magnetization curve there pass a hyperbola giving the value of magnetic energy stored in L as shown in FIG. 9. The energy levels of starting point $B_1$ and target point B are 0.5 and 10, respectively. Additionally, the ratio of energy at target point B to the energy at starting point $B_1$ is 20. This increase in energy can be achieved (using RPC in which coils are arranged in parallel) within a range where the linearity is maintained. To achieve a similar increase in energy in a conventional ESS in which coils are arranged in series, a conventional ESS would need to be 20 times the size of the conventional ESS and an increase of the amount of copper (of the coils).

Figure 11:
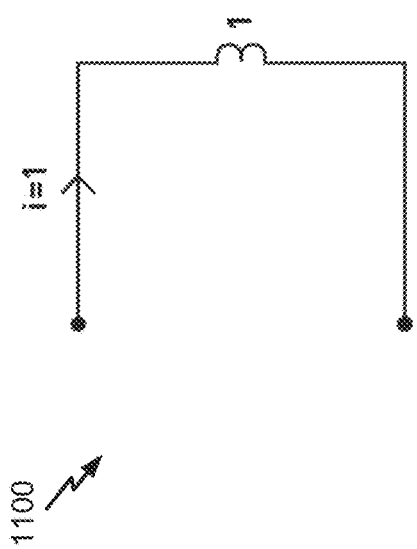
FIG. 11 is a diagram illustrating an example of current according to one or more aspects.
Figure 11:
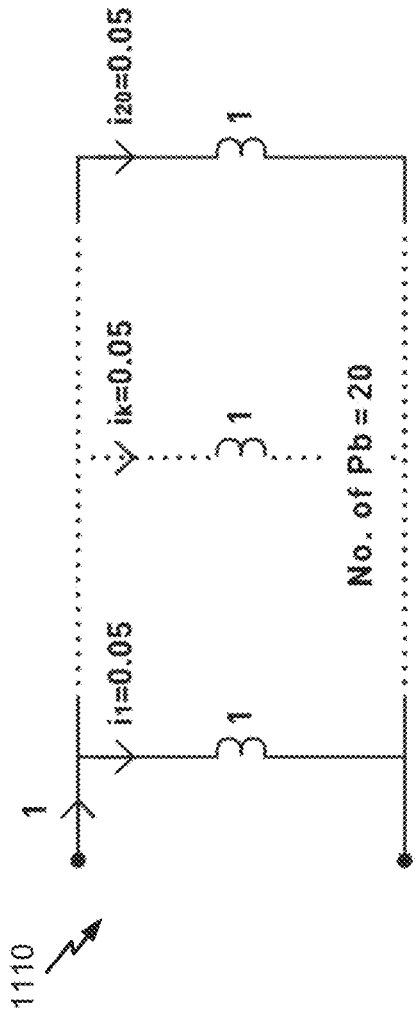

Referring to FIG. 11, FIG. 11 is a diagram illustrating an example of current according to one or more aspects. For example, FIG. 11 shows a first circuit 1100 representing an ESS with 20 coils in series and a second circuit 1110 representing an ESS with 20 coils in parallel. With reference to FIG. 11, 1 ohm of first circuit 1100 is 20 times the equivalent resistance 0.05 ohms of second circuit 1110—e.g., the equivalent resistance of 20 parallel coils represents the resistance of one coil of 20 series coils. The parallel configuration of second circuit 1110 is configured to minimizing the losses as compared to first circuit 1100 by distributing the losses into very small values by using the parallel coils (e.g., parallel circuits). The current of second circuit 1110 increases as the number of parallel branches increases to suit a desired energy storage capacity. The copper losses of first circuit 1100 (wherein "a" corresponds to first circuit 1100) and second circuit 1110 (where "b" corresponds to second circuit 1110) are as follows:

$P_c(a)=1$ $P_c(b)=\Sigma_{k=1}^{29} i_k^2 = 0.05^2 \times 20 = 0.05$    Equations (15)

The copper loss of second circuit 1110 is 5% of first circuit 1100 based on the same current criterion.

Figure 12:
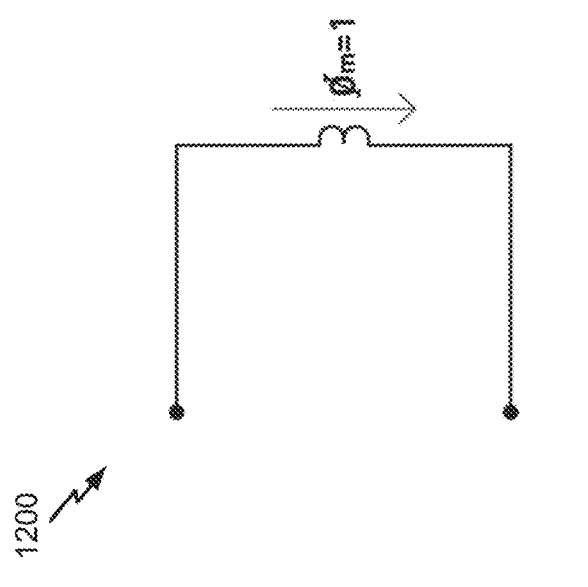
FIG. 12 is a diagram illustrating an example of magnetic fields according to one or more aspects.
Figure 12:
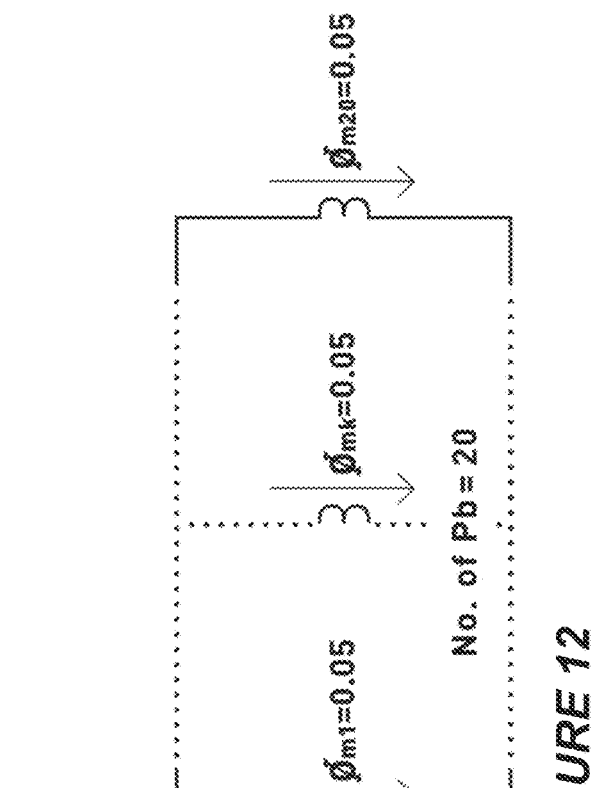

Additionally, to minimize the iron loss, the flux may be distributed in small values similarly as described above with current. To illustrate, referring to FIG. 12, FIG. 12 is a diagram illustrating an example of magnetic fields according to one or more aspects. For example, FIG. 12 shows a first circuit 1200 representing an ESS with 20 coils in series and a second circuit 1210 representing an ESS with 20 coils in parallel. First circuit 1200 may include or correspond to first circuit 1100, and second circuit 1210 may include or correspond to second circuit 1110.

Referring to FIG. 12, as the flux is saturated at Φ=1, the maximum fluxes for first circuit 1200 (e.g., coils in series) and second circuit 1210 (e.g., coils in parallel) is shown. If the number of coils in parallel of second circuit 1210 is 20, the iron loss is also 5% as compared to first circuit 1200 as shown by Equations (16).

$P_i(a) = 1$    Equation (16)

$P_i(b) = \sum_{k=1}^{20} \Phi_{mk}^2 = 0.05^2 \times 20 = 0.05$

As an illustrative example of an RPC applied to an ESS, a first circuit, such as first circuit 1100 or 1200, may include a 20-series coil system, and a second circuit, such as second circuit 1110 or 1210, may include a 20-parallel coil system. RPC may be applied to the first circuit to generate/design the second circuit to maximize the magnetic energy stored in the coil and minimize the copper and iron core losses.

The first circuit (e.g., series circuit) may have the following parameters:

−Coil Spec : 0.38φ, 160 turns

−Unit Coil Resistance $R_{us} = 0.02288 \times 160 = 3.661 \, \Omega$

−The Equivalent Resistance of 20−series coil $R_S = 3.661 \times 20 = 73.22 \, \Omega$ −Current of 20−series coil $i_p = \frac{220}{73.22} = 3A = 1\underline{pu}$ −Inductance of 20−series coil $L_S = \frac{0.05}{1} = 0.05$ −Magnetic energy of 20−series coil, $W_{m,s} = \frac{1}{2}(0.05)(1^2) = 0.025$ The second circuit (e.g., parallel circuit) may have the following parameters:

−Coil Spec : 0.085 φ, 3200 turns

−Unit Coil Resistance $R_{up} = 0.4573 \times 3200 = 1463 \, \Omega$

−The equivalent Resistance of 20−parallel coil $R_p = 73.15 \, \Omega$

−Current of 20−parallel coil $i_p = \frac{220}{73.15} = 3A = 1pu$

−Inductance of 20−parallel coil $L_p =$ $0.05 \times 20 = 1$ where the multiple voltage factor, $Mv = 20$.

−Magnetic energy of 20−parallel coil, $W_{m,p} = \frac{1}{2}(1)(1^2) = 0.5$

Regarding magnetic energy $W_{m,rpc}$ of the second circuit (e.g., 20-parallel coils) for at RR=30, in RR30, even if the number of turns decreases, the value of inductance is restored to the value of inductance before reduction by the multiple flux function. Accordingly, the current needs to be increased by $\sqrt{2}$.

$W_{m,rpc} = \frac{1}{2} \times 1 \times \sqrt{2} = 1$

The ratio of $W_{m,rpc}$ at RR30 to the magnetic energy $W_{m,s}$ of the first circuit (e.g., 20-series coils s) is as follows.

$$\text{Ratio of } \frac{W_{m,rpc}}{W_{m,s}} = \frac{1}{0.025} = 40$$

The reduced number of turns at one or more RR values may be determined to a range in which $M_v$ (Multiple Voltage Factor), $\Phi_m$ (Maximum Flux Density) and available current of coil are satisfied. Additionally, the current density of the coil may be adjusted by regulating the RR value.

Regarding copper and iron loses, the copper loss and iron loss may be determined based on Equations (15) and (16) for the second circuit (e.g., 20-parallel coils) as follows (where "b" corresponds to the second circuit—e.g., 20-parallel coils):

Copper loss for 20-parallel coil: $P_c(b) = 0.05 \times 0.7071 = 0.03536 = 3.5\%$ Iron core loss for 20-parallel coil: $P_i(b) = 0.05 = 5\%$ The number of 0.05 in the copper loss $P_c$ is a value that appears because the capacity of coil has increased by 20 times, and the number of 0.7071 is the amount of copper remaining.

Energy Efficiency Comparison between $\eta_{oriA}$ and $\eta_{rpcA}$

As an illustrative example of an RPC applied to a main coil ($G_1$ coil) of 0.17$\Phi$ and 800 turns of two-pole split phase type SPIM. The method of applying rpc to the coil is the same regardless of the type of device. Referring to FIG. 4, it is necessary to shift the starting point A left before RPC in RR30. If the starting point is A, it is converted into a U-shape conversion along the A→$A_1$→$B_1$→B* route of coil reduction, current increase and double flux and at last arrives at B*. When the operating point is A, the limit of the linear region of the iron core is A, so point B* is outside the linear region. Therefore, it is necessary to shift point A to the point $A_0$ (0.7071, 0.7071) where the energy level is reduced in half, that is, down to the left. In this case, we start from $A_0$ and arrive at point A through U-shape conversion. So we can always maintain linearity.

Since the size of the $G_1$ coil is 0.17$\phi$), the following equations are established in based on FIG. 4, where the current in each parallel coil $G_2$ is half of 0.7071:

$0.17^2 : 1.0 = G_2^2 : 0.3536$; and $G_2 = 0.11\phi, G1 = 0.1011\sqrt{2} = 0.15\phi$.

There is no coil that separates the third digit below the decimal place.

Resistance Determination at point A and $A_0$, may be defined as:

$R_{pc}A_0$: Resistance to parallel circuit at $A_0$ $R_{rpc}A$ : Resistance to RPC at A $R_{ori}A$: Resistance to original circuit (with $G_1$ coil) at A The characteristics of operating points in FIG. 4 are summarized in TABLE 5.

TABLE 5

| Symbol | OP | Coil Thickness | Turns per Pole | Connection | Resistance |
|---|---|---|---|---|---|
| $R_{pc}A_0$ | $A_0$ | 0.11 $\phi$ | 1909 | Parallel | 260 Ω |
| $R_{rpc}A$ | A | 0.11 $\phi$ | 1350 | Parallel | 184 Ω |
| $R_{ori}A$ | A | 0.17$\phi$ | 800 | Series | 183 Ω |

It can be seen that the resistance values of RPC and the original circuit (e.g. the series circuit) with different thicknesses are the same; that is, $R_{rpc}A = R_{ori}A$. The 30% reduced RPC circuit restored the function of 100% original circuit with the double flux.

Regarding torque, TABLE 6 shows torque values of operating points in FIG. 4.

TABLE 6

| OP | Coordinate in (i, $\Phi$) | Magnetic Energy, $W_m$ | Torque | note |
|---|---|---|---|---|
| $A_0$ | (0.7071, 0.7071) | 0.25 | 0.5 | $W_m = \frac{1}{2}Li^2$ |
| A | (1, 1) | 0.5 | 0.7 | $T = \frac{\partial W_m}{\partial (L, i)}$ |

Regarding energy efficiency, from the resistance values of TABLE 5 and the torque values of TABLE 6, the following results are shown in which energy efficiency is expressed as follows.

$$\eta = \frac{\text{Torque }(T)}{\text{Real Power Consumotion}(Ri^2)}$$

$$\eta_{oriA1} = \frac{0.5}{(1)(0.7071^2)} = 1$$

$$\eta_{oriA} = \frac{0.7071}{(0.7071)(1^2)} = 1$$

$$\eta_{rpcA} = \frac{0.7071}{(0.7071))(1^2)} = 1$$

$$\text{Ratio of } \frac{\eta_{rpcA}}{\eta_{oriA}} = 1$$

The energy efficiency of the developed product is the same as that of the existing product. It can be seen that the torque increases by 141% and the energy efficiency remains the same even though the copper amount is reduced by 30%. Copper usage has decreased by 30%, so it is clear that copper loss has decreased by 30%. In addition, since rpc is a parallel circuit, the maximum flux density is divided into halves, so the iron loss is also reduced to 50%.

In some implementations, RPC may be applied to a main coil ($G_1$ coil) of a first circuit (two-pole split phase type SPIM with coils in series) to determine a $G_2$ coil of a second circuit (two-pole split phase type SPIM with coils in parallel). Applying RPC to determine the $G_2$ coil may include setting a new OP by reducing the number of turns as compared to the $G_1$ coil, performing expansion and restoration of inductance by double or quadruple flux, performing reduction of copper and iron loss through parallel path, or a combination thereof. TABLE 7 shows operating and design parameters of the first circuit (e.g., series) and the second circuit (e.g., parallel) using a RR of approximately 30% and a revolutions per minute of 1650.

TABLE 7

| | G₁ Circuit Series | G₂ Circuit Parallel |
|---|---|---|
| Copper wire size | 0.17 mm | 0.12 mm |
| Number of turns | 800 | 1131 |
| Torque output | 910 gcm | 1287 gcm |
| Copper loss | 100% | 70% |
| Iron loss | 100% | 50% |
| Voltage input | 220 V | 220 V |

Figure 13:
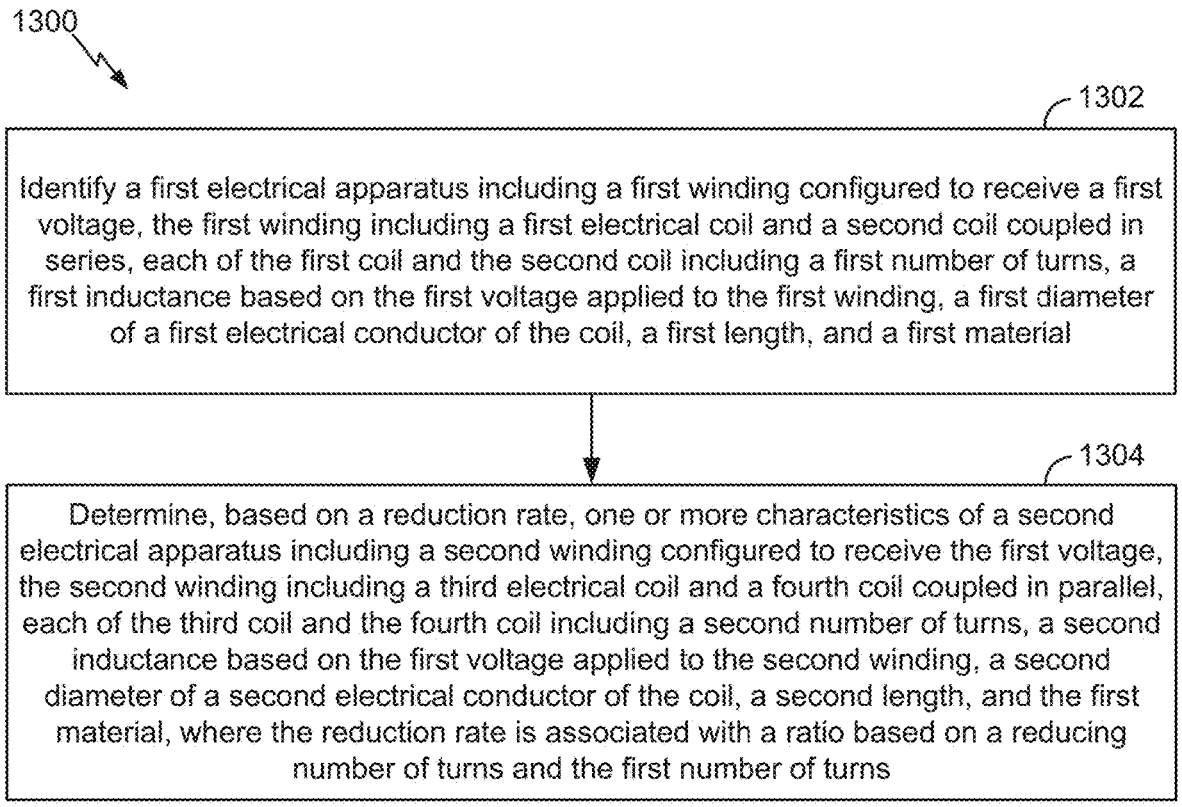
FIG. 13 is a flow diagram of an example of a process of producing an electrical device according to one or more aspects.

FIG. 13 is a flow diagram of an example of a process 1300 of producing an electrical device according to one or more aspects. Operations of the process 1300 may be performed to design, fabricate, repair, or operate an electrical device, such as electrical device/circuit 100, 200, 310, 320, 500, 520, 530, 700, 800, 1000, 1110, or 1210. In some implementations, one or more operations of processor may be performed or controlled by a system, such as computer system including a processor and a memory storing processor executable-instructions that, when executed, cause the processor to perform one or more of the operations.

In block 1302, process 1300 identifying a first electrical apparatus including a first winding configured to receive a first voltage. The first voltage may include or correspond to voltage V 112. The first winding may include or correspond to winding, such as a winding of electrical device/circuit 300, 510, 1100, or 1200. The first winding including a first electrical coil and a second coil coupled in series. Each of the first coil and the second coil includes a first number of turns, a first inductance based on the first voltage applied to the first winding, a first diameter of a first electrical conductor of the coil, a first length, and a first material. For example, each of the first coil and the second coil may include, substantially or exactly, the same first number of turns, the same first inductance based on the first voltage applied to the first winding, the same first diameter of a first electrical conductor of the coil, the same first length, and the same first material.

In block 1304, determining, based on a reduction rate, one or more characteristics of a second electrical apparatus including a second winding configured to receive the first voltage. The second electrical apparatus may include or correspond to electrical device/circuit 100, 200, 310, 320, 500, 520, 530, 700, 800, 1000, 1110, or 1210. The second winding may include or correspond to winding 120. The second winding include a third electrical coil and a fourth coil coupled in parallel. The third electrical coil and the fourth electrical coil may include or correspond to first coil 122 and second coil 124, respectively. Each of the third coil and the fourth coil may include a second number of turns, a second inductance based on the first voltage applied to the second winding, a second diameter of a second electrical conductor of the coil, a second length, and the first material. For example, each of the third coil and the fourth coil may include, substantially or example, the same second number of turns, the same second inductance based on the first voltage applied to the second winding, the same second diameter of a second electrical conductor of the coil, the same second length, and the same first material. The reduction rate may be associated with a ratio based on a reducing number of turns and the first number of turns. In some implementations, the reduction ratio is a ratio of a reducing number of turns to two times the first number of turns.

In some implementations, process 1300 further includes selecting the reduction rate. Process 1300 may also include determining the second number of turns. Determining the second number of turns may include multiplying the reduction rate by two times the first number of turns to determine a reducing number of turns; and subtracting the reducing number of turns from two times the first number of turns to generate the second number of turns. Although the reduction rate is described as being multiplied by two times the first number of terms times two to determine the reducing number of turns, in other implementations, the reduction rate may be multiplied by the product of the first number of turns and substantially or about two. Stated differently, determining the reducing number of terms may include determining a particular number of terms that is substantially or about double the first number of turns and multiplying the reduction rate and the particular number of turns to determine the reducing number of turns. It is noted that the reducing number of turns may be rounded (up or down) to an integer value.

In some implementations, a particular number of turns (e.g., an initial unreduced number of turns) associated with the second number of turns may be determined based on the first number of turns, a conductor size (e.g., a diameter) of an electrical conductor of the second coil, a current ampacity of the second coil, a resistance per turn of the second coil, or a combination thereof. The reducing number of turns may be determined based on a product of reduction rate and the particular number of turns. The reducing number of turns may then be subtracted from the particular number of turns to determine the second number of turns.

Additionally, or alternatively, the first electrical apparatus and the second electrical apparatus are the same device type. For example, the same device type is a single phase motor, a three phase motor, or an energy storage system. In some implementations, the first electrical coil and the second electrical coil have the same resistivity, the third electrical coil and the fourth electrical coil have the same resistivity, or the first, second, third, and fourth coil each have substantially or exactly the same resistivity.

In some implementations, the first electrical apparatus includes a first amount of iron, the second electrical apparatus includes a second amount of iron, and the second amount of iron is less than the first amount of iron. Additionally, or alternatively, the second number of turns is less than the first number of turns of the first electrical coil, the second inductance is greater than the first inductance, the second diameter is a smaller than the first diameter, the second length of is greater than the first length, or a combination thereof.

In some implementations, process 1300 further includes manufacturing the second electrical apparatus based on the one or more characteristics. For example, the one or more characteristics may include a material of the winding, an input voltage, a torque output of the second electrical device, a diameter of an electrical conductor of the winding, a number of turns of each coil of the winding, a length of each winding, an amount of iron, or a combination thereof. In some implementation, manufacturing the second electrical apparatus includes coupling the third coil and the fourth coil to a structure (such as a stator or toroid). Additionally, or alternatively, process 1300 may include coupling the third coil and the fourth coil in parallel to form the second winding configured to receive the first voltage. In some implementations, process 1300 includes providing, substantially or exactly, the first voltage to the second winding.

In some implementations, the second winding further includes a fifth electrical coil and a sixth electrical coil. The third electrical coil and the fifth electrical coil may be coupled in series and form a first set of coils. Additionally, or alternatively, the fourth electrical coil and the sixth electrical coil are coupled in series and form a second set of coils. In some implementations, the first set of coils and the second set of coils are coupled in parallel and are each configured to receive the first voltage.

In some implementations, the second winding further includes a fifth electrical coil and a sixth electrical coil. Each of the third, fourth, fifth, and sixth electrical coil coupled in parallel and configured to receive the first voltage.

Figure 14:
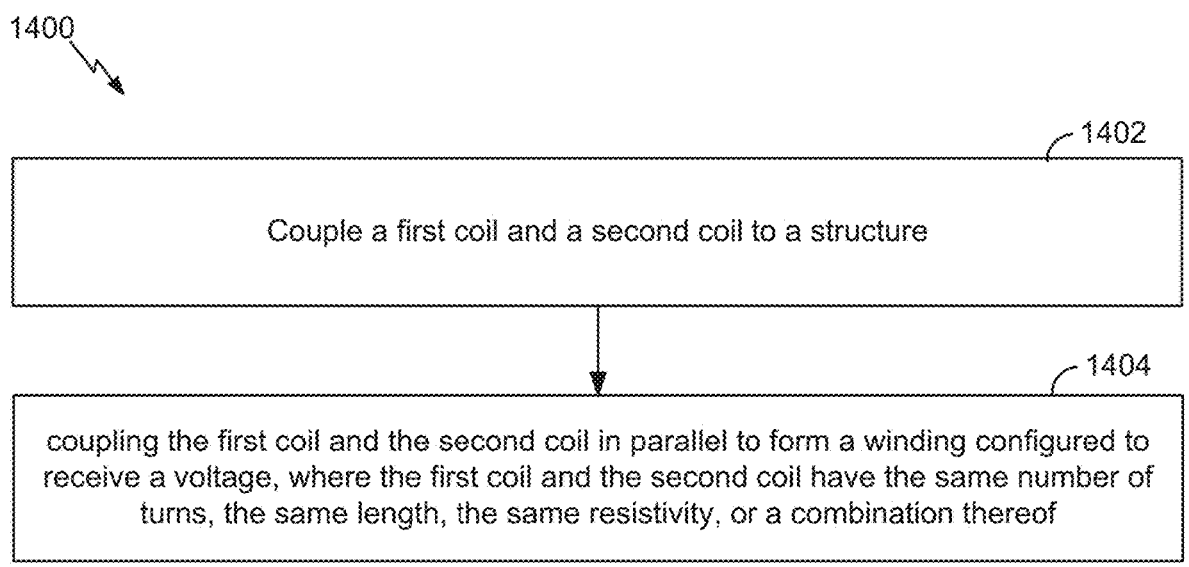
FIG. 14 is a flow diagram of an example of a process of manufacturing an electrical device according to one or more aspects.

FIG. 14 is a flow diagram of an example of a process 1400 of manufacturing an electrical device according to one or more aspects. Operations of the process 1400 may be performed to design, fabricate, repair, or operate an electrical device, such as electrical device/circuit 100, 200, 310, 320, 500, 520, 530, 700, 800, 1000, 1110, or 1210. In some implementations, one or more operations of processor may be performed or controlled by a system, such as computer system including a processor and a memory storing processor executable-instructions that, when executed, cause the processor to perform one or more of the operations.

In block 1402, process 1400 includes coupling a first coil and a second coil to a structure. The structure may include or correspond to structure 140, stator 240, or a toroid. The first coil and the second coil ma include or correspond to first coil 122 and second coil, respectively. In some implementations, process 1400 may also include forming the first coil from a first electrical conductor, forming the second coil from a second electrical conductor, or a combination thereof.

In block 1404, process 1400 also includes coupling the first coil and the second coil in parallel to form a winding configured to receive a voltage. The voltage may include or correspond to voltage V 112. The first coil and the second coil have, substantially or exactly, the same number of turns, the same length, the same resistivity, or a combination thereof.

In some implementations, the electrical apparatus includes a single phase motor, a three phase motor, or an energy storage system. Additionally, or alternatively, process 1400 may include providing the voltage across the winding.

Figure 15:
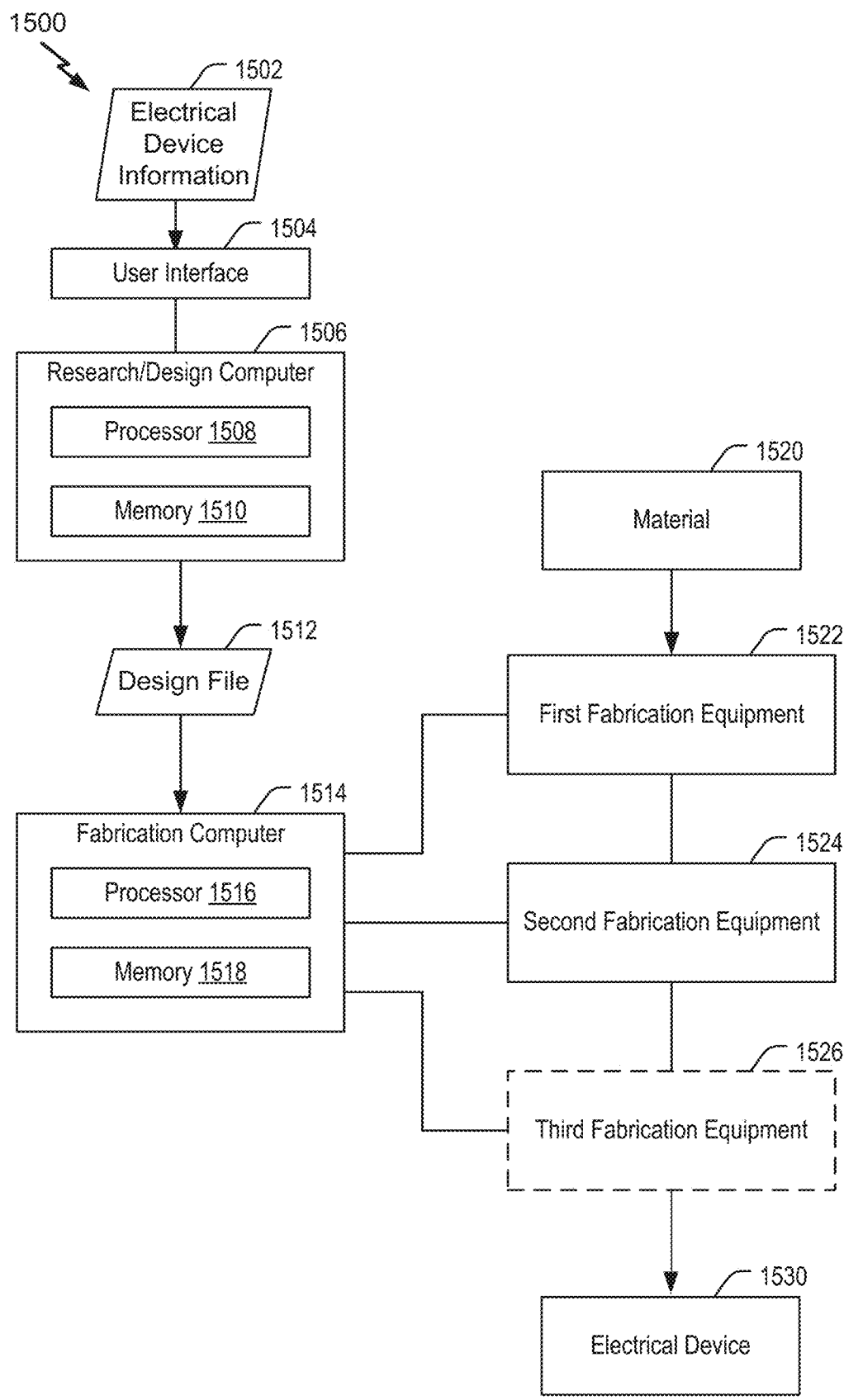
FIG. 15 is a block diagram of an example of a system for fabricating an electrical device according to one or more aspects.

The foregoing disclosed electrical devices (e.g., 100, 200, 310, 320, 500, 520, 530, 700, 800, 1000, 1110, or 1210) may be designed and configured into computer files stored on a computer readable media. Some or all of such files may be provided to fabrication handlers who fabricate the electrical device based on such files. The electrical devices are then packaged and shipped to users. In some implementations, the electrical devices may be shipped in an assembled or partially assembled state. FIG. 15 depicts an example of a system 1500 for fabricating electrical device 1530.

Electrical device information 1502 is received at a research/design computer 1506. Electrical device information 1502 may include design information representing at least one physical property of an electrical device 1530, such as 100, 200, 310, 320, 500, 520, 530, 700, 800, 1000, 1110, or 1210. For example, electrical device information 1502 may comprise dimensions or parameters and may be received or determined, via a user interface 1504 coupled to research/design computer 1506. Research/design computer 1506 includes a processor 1508, such as one or more processing cores, coupled to a computer readable medium such as a memory 1510. Memory 1510 may store computer readable instructions that are executable to cause processor 1508 to transform electrical device information 1502 into a design file 1512. Design file 1512 may include information indicating a design for an electrical device, such as the dimensions and parameters corresponding to a specific electrical device. Design file 1512 may be in a format that is usable by other systems to perform fabrication, as further described herein.

Design file 1512 is provided to a fabrication computer 1514 to control fabrication equipment during a fabrication process for a material 1520 (e.g., copper, iron, steel, etc.). Fabrication computer 1514 includes a processor 1516 (e.g., one or more processors), such as one or more processing cores, and a memory 518. Memory 1518 may include executable instructions such as computer-readable instructions or processor-readable instructions that are executable by a computer, such as processor 1516. The executable instructions may enable processor 1516 to control fabrication equipment, such as by sending one or more control signals or data, during a fabrication process for material 1520. In some implementations, the fabrication system (e.g., an automated system that performs the fabrication process) may have a distributed architecture. For example, a high-level system (e.g., processor 1516) may issue instructions to be executed by controllers of one or more lower-level systems (e.g., individual pieces of fabrication equipment). The lower-level systems may receive the instructions, may issue sub-commands to subordinate modules or process tools, and may communicate status back to the high-level system. Thus, multiple processors (e.g., processor 1516 and one or more controllers) may be distributed in the fabrication system.

The fabrication equipment includes first fabrication equipment 1522, second fabrication equipment 1524, and optional third fabrication equipment 1526. First fabrication equipment 1522 is configured to form a first coil of a winding, such as winding 120. Second fabrication equipment 824 is form a second coil of the winding. Third fabrication equipment 1526 is configured to couple the first and second coils to form the winding. After second or third fabrication equipment 1524, one or more components may be assembled and/or packaged at 1530.

Fabrication computer 1514 may be configured to initiate one or more operations of first fabrication equipment 1522, second fabrication equipment 1524, and/or third fabrication equipment 526. For example, processor 1516 may execute instructions stored at memory 1518 to perform operations including forming electrical device 1530. System 1500 enables fabrication of an electrical device, with multiple coils in parallel.

It is noted that one or more blocks (or operations) described with reference to FIGS. 13-15 may be combined with one or more blocks (or operations) described with reference to another of the figures. For example, one or more blocks (or operations) of FIG. 13 may be combined with one or more blocks (or operations) of FIG. 14. As another example, one or more blocks associated with FIG. 15 may be combined with one or more blocks (or operations) associated with FIG. 13 or 14. As another example, one or more blocks associated with FIGS. 13-15 may be combined with one or more blocks (or operations) associated with FIGS. 1-12.

Certain features that are described in this specification in the context of separate implementations also can be implemented in combination in a single implementation. Conversely, various features that are described in the context of a single implementation also can be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

Those of skill in the art would understand that information, message, and signals may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Components, the functional blocks, and the modules described herein with the figures include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. The various illustrative logics, logical blocks, modules, circuits and algorithm processes described in connection with the implementations disclosed herein may be implemented as electronic hardware, computer software, or combinations of both. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Additionally, the operations of a method or algorithm may reside as one or any combination or set of codes and instructions on a machine readable medium and computer-readable medium, which may be incorporated into a computer program product.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. Unless stated otherwise, the word or as used herein is an inclusive or and is interchangeable with "and/or," such that when "or" is used in a list of two or more items, means that any one of the listed items can be employed by itself, or any combination of two or more of the listed items can be employed. To illustrate, A, B, or C includes: A alone, B alone, C alone, a combination of A and B, a combination of A and C, a combination of B and C, or a combination of A, B, and C. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing"). As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any implementation of any of the systems, methods, and article of manufacture can consist of or consist essentially of—rather than comprise/have/include—any of the described steps, elements, or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

The claims are not intended to include, and should not be interpreted to include, means-plus- or step-plus-function limitations, unless such a limitation is explicitly recited in a given claim using the phrase(s) "means for" or "step for," respectively.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure and following claims are not intended to be limited to the examples and designs described herein but is to be accorded the widest scope consistent with the principles and novel features disclosed herein.

The invention claimed is:

1. A method for manufacturing a second electrical apparatus comprising a stator, a rotor and a plurality of coupled electrical coils, the method comprising:
   identifying a first electrical apparatus including a first winding configured to receive a first voltage, the first winding including a first electrical coil and a second electrical coil coupled in series, each of the first electrical coil and the second electrical coil including a first number of turns, and a first inductance based on the first voltage applied to the first winding, wherein the first winding comprises: a first electrical conductor having a first diameter, a first length and a first material; and
   determining, a reduction rate, and based on the reduction rate, determining characteristics of the second electrical apparatus that includes a second winding configured to receive the first voltage, the second winding including a third electrical coil and a fourth electrical coil coupled in parallel, each of the third electrical coil and the fourth electrical coil including a second number of turns, and a second inductance based on the first voltage applied to the second winding, wherein the second winding comprises: a second electrical conductor having a second diameter, a second length and the first material;
   wherein determining the reduction rate and the second number of turns at least by:
     selecting the reduction rate and multiplying the reduction rate by two times the first number of turns to determine a reducing number of turns; and
     subtracting the reducing number of turns from two times the first number of turns to generate the second number of turns; and
   manufacturing the second electrical apparatus based on the characteristics at least by winding the second electrical conductor and forming the third and fourth electrical coils coupled in parallel according to the determined second number of turns;
     wherein the reduction rate corresponds to a ratio based on a reducing number of turns to two times the first number of turns.

2. The method of claim 1, wherein:
   the first electrical apparatus and the second electrical apparatus are the same device type;
   the first electrical coil and the second electrical coil have the same resistivity; and
   the third electrical coil and the fourth electrical coil have the same resistivity.

3. The method of claim 2, wherein the same device type is a single phase motor, a three phase motor, or an energy storage system.

4. The method of claim 1, wherein the second number of turns is less than the first number of turns of the first electrical coil, the second inductance is greater than the first inductance, the second diameter is a smaller than the first diameter, the second length is greater than the first length, or a combination thereof.

5. The method of claim 1, wherein manufacturing the second electrical apparatus includes:
coupling the third electrical coil and the fourth electrical coil to a structure; and
coupling the third electrical coil and the fourth electrical coil in parallel to form the second winding configured to receive the first voltage.

6. The method of claim 1, wherein:
the second winding further includes a fifth electrical coil and a sixth electrical coil;
the third electrical coil and the fifth electrical coil are coupled in series and form a first set of coils;
the fourth electrical coil and the sixth electrical coil are coupled in series and form a second set of coils; and
the first set of coils and the second set of coils are coupled in parallel and are each configured to receive the first voltage.

7. The method of claim 1, wherein:
the second winding further includes a fifth electrical coil and a sixth electrical coil; and
each of the third, fourth, fifth, and sixth electrical coil are coupled in parallel and configured to receive the first voltage.

8. The method of claim 1, wherein: manufacturing the second electrical apparatus includes:
providing the stator defining a space;
providing the rotor positioned within the space; and
providing the second winding coupled to the stator and configured to receive the first voltage, the second winding comprising:
the third electrical coil associated with a first pole; and
the fourth electrical coil associated with a second pole and coupled to the third electrical coil in parallel, and
the third electrical coil and the fourth electrical coil have the same number of turns, the same length, the same resistivity, or a combination thereof.

9. The method of claim 8, wherein:
the second electrical apparatus includes a single phase induction motor;
the third electrical coil, the fourth electrical coil, or both include copper; or
a combination thereof.

10. The method of claim 8, wherein:
the second electrical apparatus includes a three phase motor; and
the second winding is associated with a first phase of the three phase motor.

11. The method of claim 8, wherein:
the second winding includes a main winding;
the third electrical coil includes a first end and a second end; and
the fourth electrical coil includes a first end and a second end.

12. The method of claim 1, wherein the second electrical apparatus includes:
the second winding comprising:
the third electrical coil associated with a first pole; and
the fourth electrical coil associated with a second pole and coupled to the third electrical coil in parallel;
the second winding further includes a fifth electrical coil associated with a third pole and a sixth electrical coil associated with a fourth pole, and
the fifth and sixth electrical coils coupled in parallel.

13. The method of claim 1, wherein:
the second winding includes a main winding; and
an auxiliary winding coupled to the main winding, the second winding comprising:
a fifth electrical coil; and
a sixth electrical coil coupled to the fifth electrical coil in parallel.

14. The method of claim 11, wherein the third electrical coil and the fourth electrical coil have: the same material, the same number of turns, same resistivity, same diameter, or a combination thereof.

15. The method of claim 11, wherein:
the first end of the third electrical coil and the first end of the fourth electrical coil are coupled together to form a first end of the second winding;
the second end of the third electrical coil and the second end of the fourth electrical coil are coupled together to form a second end of the second winding; and
the first end of the second winding and the second end of the second winding are configured to receive the first voltage.

* * * * *